United States Patent
Wade et al.

(10) Patent No.: US 12,184,904 B1
(45) Date of Patent: Dec. 31, 2024

(54) COMBINATION OF NETWORK SEGMENTATION AND USER SEGMENTATION FOR MULTI-DWELLING UNIT (MDU) AND GROUP RECORDING

(71) Applicants: DISH Network L.L.C., Englewood, CO (US); DISH Network Technologies India Private Limited, Karnataka (IN)

(72) Inventors: Joshua D. Wade, Castle Rock, CO (US); Jason Anthony Madruga, Castle Rock, CO (US); Clark Hurst Pendery, Englewood, CO (US); Dalton William Hertel, Denver, CO (US); Aaron William Schwartz, Denver, CO (US); Ryan Scribner, Erie, CO (US); Himanshu Jain, Karnataka (IN); Sandeep Kumar Bhatta, Karnataka (IN); Laxminarayana Dalimba, Karnataka (IN)

(73) Assignees: DISH Network L.L.C., Englewood, CO (US); DISH Network Technologies India Private Limited, Karnataka (IN)

( * ) Notice: Subject to any disclaimer, the term of this patent is extended or adjusted under 35 U.S.C. 154(b) by 0 days.

(21) Appl. No.: 18/357,843

(22) Filed: Jul. 24, 2023

(51) Int. Cl.
*H04N 21/214* (2011.01)
*H04N 21/45* (2011.01)

(52) U.S. Cl.
CPC ..... *H04N 21/2143* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 8,621,530 B1 * | 12/2013 | Guzman | H04N 21/6547 725/74 |
| 11,991,230 B1 * | 5/2024 | Wade | H04L 65/612 |
| 2011/0293277 A1 | 12/2011 | Bradea et al. | |
| 2014/0244778 A1 | 8/2014 | Wyatt et al. | |
| 2017/0272196 A1 | 9/2017 | Davidson, Jr. et al. | |
| 2019/0268633 A1 | 8/2019 | Jayawardene et al. | |
| 2019/0303562 A1 | 10/2019 | Masputra et al. | |
| 2020/0310735 A1 * | 10/2020 | Dean-Bhïyan | G06F 3/011 |

(Continued)

FOREIGN PATENT DOCUMENTS

WO 2013/142967 A1 10/2013

OTHER PUBLICATIONS

"Home Gateway Technical Requirements: Residential Profile", Home Gateway Initiative, Apr. 29, 2008, pp. 1-125, XP055121004.

*Primary Examiner* — Junior O Mendoza
(74) *Attorney, Agent, or Firm* — Kilpatrick Townsend & Stockton LLP

(57) ABSTRACT

Methods and systems for provisioning content streaming services are provided. In one example, a method includes: receiving user registration data for users associated with an MDU, generating a user profile for each user, grouping users into multiple segments based on common user experience level and/or common features, performing network segmentation of the MDU network, generating an integrated user-network segment profile for each user segment, designating streaming services and content resources to each network segment within the same user segment, and provisioning streaming services and content resources in response to user requests.

20 Claims, 15 Drawing Sheets

(56) References Cited

U.S. PATENT DOCUMENTS

| | | |
|---|---|---|
| 2023/0144753 A1 | 5/2023 | Jayawardene et al. |
| 2023/0179827 A1* | 6/2023 | Coburn, IV ........ H04L 12/2809 |
| | | 725/78 |
| 2023/0217059 A1* | 7/2023 | D'Amato ............. H04N 21/436 |
| | | 725/78 |

* cited by examiner

800

```
┌─────────────────────────────────────────────────────────────┐
│ Receive user registration data of multiple users associated │
│ with an MDU, the user registration data including user      │
│ identifier and user experience level for each user          │
│                                                         802 │
└─────────────────────────────────────────────────────────────┘
                              │
                              ▼
┌─────────────────────────────────────────────────────────────┐
│ Generate a user profile for each user, the user profile     │
│ including the user registration data, viewership data, and  │
│ at least one user feature                                   │
│                                                         804 │
└─────────────────────────────────────────────────────────────┘
                              │
                              ▼
┌─────────────────────────────────────────────────────────────┐
│ Group the users to generate multiple user segments, each    │
│ user segment including a list of users associated with the  │
│ user segment and at least one common feature or attribute   │
│ of the users                                                │
│                                                         806 │
└─────────────────────────────────────────────────────────────┘
                              │
                              ▼
┌─────────────────────────────────────────────────────────────┐
│ Designate specific streaming service and content resource   │
│ to each user segment, based on the common user experience   │
│ level and the common feature according to a pre-defined     │
│ policy                                                      │
│                                                         808 │
└─────────────────────────────────────────────────────────────┘
                              │
                              ▼
┌─────────────────────────────────────────────────────────────┐
│ Map streaming services and content resources to network     │
│ segments within the same user segment                       │
│                                                         810 │
└─────────────────────────────────────────────────────────────┘
                              │
                              ▼
┌─────────────────────────────────────────────────────────────┐
│ Provide the designated streaming service and content        │
│ resource to a user of the MDU, based on the user segment    │
│ to which the user belongs                                   │
│                                                         812 │
└─────────────────────────────────────────────────────────────┘
```

FIG. 8

COMBINATION OF NETWORK SEGMENTATION AND USER SEGMENTATION FOR MULTI-DWELLING UNIT (MDU) AND GROUP RECORDING

BACKGROUND OF THE DISCLOSURE

A multi-dwelling unit (MDU) such as a hotel often provides content streaming services for the users (e.g., tenants, residents, guests, staffs, employees, etc.) within the MDU. However, users in the same MDU may have different preferences for the type of content they want to stream, and if the content streaming service is not diversified, users may receive content that is not relevant to their interests or needs, leading to poor user experiences. In addition, provisioning the same content streaming service to all users of an MDU can result in inefficient resource allocation. Users who do not use the service will consume resources that could be used by other users who request the service. Thus, there is a need for improving content streaming service and user viewing experience in an MDU environment.

BRIEF SUMMARY OF THE DISCLOSURE

In accordance with some embodiments of the present disclosure, a method is provided. In one example, a method includes: generating a plurality of network segments for a multi-dwelling unit (MDU), each network segment corresponds to one zone of the MDU and is assigned with a unique network identifier. The method further includes generating a plurality of user profiles respectively for a plurality of users associated with the MDU, wherein each user profile includes a user identity, user registration information, a user experience level, and at least one user feature of the user. The method further includes: generating a plurality of user segments and associating one or more of the plurality of users to each user segment, based on a common user experience level shared among the users of the user segment, generating an integrated user-network segment profile for each user segment, the integrated user-network segment profile including streaming service and content resource designated to each one of the network segments within the user segment, receiving a user request for streaming a content item from a user equipment (UE) connected to one of the network segments, the user request including the network identifier assigned to the network segment and the user identity associated with the user, identifying the integrated user-network segment profile to which the user belongs, based on the user identity, identifying the network segment to which the UE is connected, based on the network identifier, determining accessibility of content item to the user based on the streaming services and content resources designated to the identified network segment and the identified user segment, and in response to a determination that the content item is accessible through the network segment, transmitting the requested content item to the UE via a routed network traffic over the network segment.

In another example, a method includes: receiving a user request for streaming service from a user of an MDU, identifying a network segment to which the user is connected, identifying the integrated user-network segment profile to which the user belongs to, determining accessibility of the streaming/content service to the user based on the integrated user-network profile, authenticating the user, and provide access to the requested streaming/content service for the user based on the network segment and the user segment profile.

In yet another example, a method includes: performing group recording to generate a shared recording for users of an MDU, receiving a user request for access to the shared recording, identifying a network segment associated with the user, identifying the user segment to which the user belongs to, determining accessibility of the streaming/content service to the user based on the integrated user-network segment profile, authenticate the user, and providing access to the shared recording for the user.

In accordance with some embodiments of the present disclosure, a system for provisioning content streaming service for an MDU is provided. In one example, the system includes: one or more processors and a computer-readable storage media storing computer-executable instructions. The computer-executable instructions, when executed by the one or more processors, cause the system to: generate a plurality of network segments for a multi-dwelling unit (MDU), each network segment corresponding to one zone of the MDU and assigned with a unique network identifier, generate a plurality of user profiles respectively for a plurality of users associated with the MDU, each user profile including a user identity, user registration information, a user experience level, and at least one user feature of the user, generating a plurality of user segments and associating one or more of the plurality of users to each user segment, based on a common user experience level shared among the users of the user segment, generating an integrated user-network segment profile for each user segment, the integrated user-network segment profile including streaming service and content resource designated to each one of the network segments within the user segment, receiving a user request for streaming a content item from a UE connected to one of the network segments, the user request including the network identifier assigned to the network segment and the user identity associated with the user, identifying the integrated user-network segment profile to which the user belongs, based on the user identity, identifying the network segment to which the UE is connected, based on the network identifier, determining accessibility of content item to the user based on the streaming services and content resources designated to the identified network segment and the identified user segment, and in response to a determination that the content item is accessible through the network segment, transmitting the requested content item to the UE via a routed network traffic over the network segment.

In accordance with some embodiments, the present disclosure also provides a non-transitory machine-readable storage medium encoded with instructions, the instructions executable to cause one or more electronic processors of a system to perform any method described in the present disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8 is a flow diagram illustrating another example method for provisioning content streaming service to a user of an MDU, according to various embodiments.

DETAILED DESCRIPTION OF THE DISCLOSURE

The present disclosure provides devices, systems, and methods for provisioning content streaming services to users of an MDU. One insight provided in the present disclosure is related to a combination of network segmentation and user segmentation to differentiate and personalize content streaming services among users of an MDU. According to some embodiments of the present disclosure, a method includes receiving user registration data for users associated with an MDU, generating a user profile for each user, grouping users into multiple segments based on common user experience level and/or common features, performing network segmentation of the MDU network, generating an integrated user-network segment profile for each user segment, designating streaming services and content resources to each network segment within the same user segment, and provisioning streaming services and content resources in response to user requests.

The integrated user-network segment profile brings together the advantages of both user segmentation and network segmentation and enables more enhanced personalization of content streaming services to MDU users. By combining common user features, common user experience levels, and the network context using a double-layer-segmentation approach, the integrated user-network segment profile enables more accurate and personalized content recommendations as well as content resource allocation and delivery. The double-layer-segmentation according to the present disclosure takes into account not only user-specific attributes but also the capabilities and characteristics of the network segment the user is connected to. This results in more tailored recommendations that align with the user's preferences on streaming services, user's specification location in the MDU, as well as the network conditions of the MDU. The integrated user-network segment profile also provides a more holistic view of user preferences and network characteristics, allowing for efficient content resource allocation. Content delivery can be optimized based on common user interest or preferences as well as network capacities, bandwidth availability, or other network-specific considerations.

Combination of user segmentation and network segmentation may also enhance network-aware service differentiation within a particular user segment, improve efficiency of content provisioning and network management, and foster customer loyalty, engagement, and satisfaction.

Figure 1:
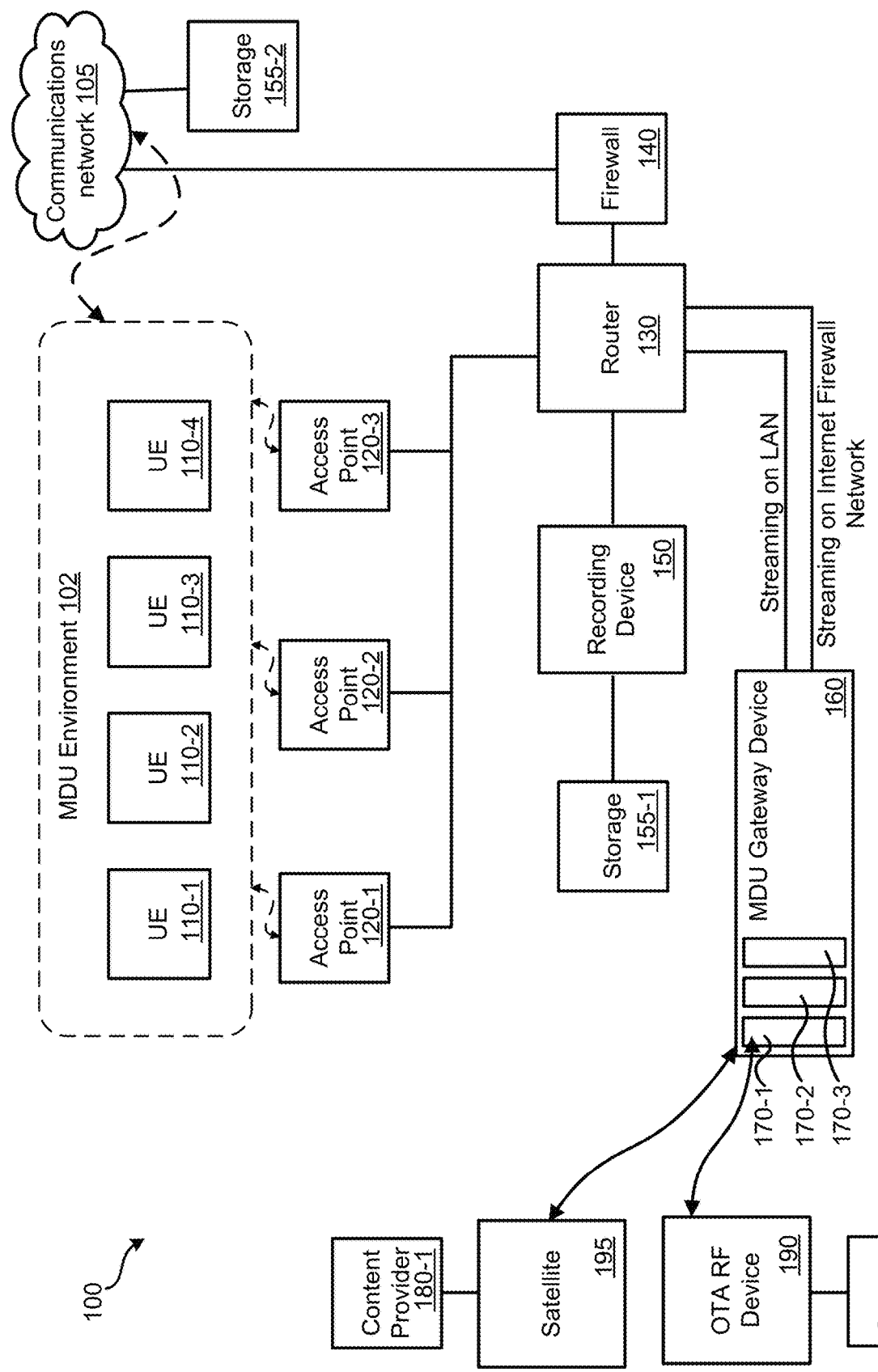
FIG. 1 is a schematic diagram illustrating an example of a communications system according to various embodiments.

FIG. 1 is a schematic diagram illustrating an example of a communications system 100 (also referred to as "system 100") for provisioning content streaming service and content resources to users of an MDU, according to various embodiments. In the illustrated example, the system 100 includes, among other components, multiple user equipments (UEs) 110 (or user devices 110) in an MDU environment 102 (also referred to as "MDU 102"), a communications network 105, multiple access points 120, an MDU gateway device 160, a recording device 150, a storage device 155, a router 130 (or a network traffic routing device or the like), and a firewall 140.

The MDU 102 used herein refers to a residential building or complex that contains multiple compartments or separate living units within a single structure. Examples of MDUs include apartment buildings consisting of multiple individual apartments within a single building, condominiums in which individual units are owned by their occupants but the common areas and facilities are shared, townhouses or similar buildings with multi-story units, co-operative housing that operates under a different ownership and governance model in which the residents collectively manage the property, duplexes and triplexes, hotels, motels, dormitories, downtown lofts, a senior living center, a college or university campus, an apartment complex.

Multiple UEs 110 (e.g., 110-1, 110-2, 110-3, 110-4, etc.) are located within the MDU environment 102. The UEs may be owned, operated, controlled by various users across the multiple units of the MDU 102. A household or a user of each unit of the MDU 102 may have one or more UEs. The users within the same MDU 102 may not share their UEs. However, UEs within one single unit of the MDU 102 may be interconnected through a local network (not illustrated) such as a wireless network or a wired network. The UE 110 is generally used by the user to access the communications network 105 to receive, stream, play, and present media content from any content resources internal within the MDU 102 and external to the MDU 102 (e.g., from a content provider). Examples of UE 110 include televisions (TV) and smart TVs, user devices, set top boxes, satellite set top box, gaming consoles, smartphones, tables, wearables, streaming sticks, smart projectors, virtual reality and augmented reality (VR/AR) devices, integrated receiver decoders, and so on. In a hotel MDU, the UEs 110 may be a fixed UE such as a TV permanently installed in a unit or an area of the MDU 102 or a mobile user device carried along with a user. The UEs 110 may communicate with the MDU gateway device 160 and/or access the communications network 105 through one or more access points 120 (e.g., 120-1, 120-2, 120-3, etc.).

The access points 120 are generally network devices that extend the network coverage within the MDU 102, enable the UEs 110 to connect to the MDU gateway device 160, and enable the UEs 110 to access the communications network 105. In some embodiments, an access point (e.g., 120-1) may be installed within one unit of the MDU 102 and exclusively used by UEs within the unit. Alternatively, an access point may be installed in a common area of the MDU 102 and shared by UEs across various units of the MDU 102.

The MDU gateway device 160 functions as a central hub for the communication of UEs 110 of the individual units within the MDU 102. The MDU gateway device 160 may be included in a content delivery system (e.g., the content delivery system 306 of FIG. 3A) as an internal or integrated component thereof. In some embodiments, the MDU gateway device 160 is installed in the MDU 102 by the MDU administrator (e.g., a property manager). Among other capabilities, the MDU gateway device 160 is configured to receive content from content providers, transfer the content to the UEs 110, record the content to generate a unique or shared copy of the content, and delivery the unique or shared copy of content to an authorized and eligible UE 110 within the MDU 102 in response to a request.

The MDU gateway device 160 may be in communication with content providers 180 (i.e., 180-1, 180-2, etc.) through data transmission devices, such as over-the-air (OTA) radio frequency (RF) device 190 or satellite 195. Satellite 195 may be used to transmit content to the MDU gateway device 160 over television and radio broadcasting, as well as for internet access in remote areas where traditional wired connections are not available. On the other hand, the OTA RF device 190 may be used to transmit content to the MDU gateway device 160 over a wireless network, such as Wi-Fi or cellular networks. In some embodiments, the content provider is a commercial streaming service provider such as SLINGTV® or DISH DBS®. In some embodiments, the MDU gateway device 160 is included in a content delivery system (e.g., the content delivery system 306 of FIG. 3A). Other content delivery and recording systems are also within the scope of the present disclosure.

Alternatively, in other embodiments, the MDU gateway device 160 may be in connection with a head end (not shown) separate from the MDU gateway device 160. The head end (e.g., a branded smart box of a content provider, or a smart box designed and provided by a third party) is in communication with the content providers 180 and is configured to receive content from the content providers 180 and further transmit the content to the MDU gateway device 160. In other words, the MDU gateway device 160 may receive content from the content provider 180 via the separate head end.

The MDU gateway device 160 may include one or more origin servers 170 (e.g., 170-1, 170-2, 170-3, etc.) configured to stream the content received from the content providers 180. The origin server 170 includes a hardware component used to enable streaming or content over either a local area network (LAN) or a wide area network (WAN). The origin server may include a specialized processing unit designed to handle streaming traffic with low latency and high throughput. The origin server 170 can be used to support various types of streaming protocols and codecs, including popular protocols such as HTTP Live Streaming (HLS), Real Time Messaging Protocol (RTMP), Multicast IP based Streaming, and Dynamic Adaptive Streaming over HTTP (DASH). The origin server 170 can also support different quality levels and resolutions to accommodate different network conditions and device capabilities.

The router 130 is configured to facilitate communications between the UEs 110 and the MDU gateway device 160, the recording device 150, and the storage device 155 within the MDU 102. The router 130 can be connected to the MDU gateway device 160 either through a wired or wireless connection. Once connected, the router 130 can assign unique IP addresses to each UE 110 or access points 120 within the network, allowing them to communicate with each other and with devices outside the network. The content received by the MDU gateway device 160 may be distributed to the UEs 110 and other devices within the MDU 102 (e.g., the recording device 150) via the router 130 through LAN streaming.

The firewall 140 (also referred to as "network firewall 140") connected to the communications network 105 is configured to monitor and control incoming and outgoing network traffic to prevent unauthorized access or attacks from outside the MDU 102. In some embodiments, the firewall is integrated to or installed on the MDU gateway device 160 that connects the internal network of the MDU 102 to the communications network 105. The firewall 140 may be in a form of a physical hardware device, a software-based firewall running on the MDU gateway device 160, or a combination thereof. In some embodiments, the firewall 140 may also provide additional features such as Quality of Service (QOS) control, which can prioritize network traffic for certain applications to ensure smooth and consistent performance for content streaming and sharing. In some embodiments, the content received by the MDU gateway device 160 is distributed to the UEs 110 and other devices within the MDU 102 (e.g., the recording device 150) via the firewall 140 through WAN streaming.

The recording device 150 is connected to the MDU gateway device 160 via the router 130. The recording device 150 is configured to record the content received by the MDU gateway device 160 and generate a copy of the content. The copy of the content may be stored in a storage device 155. The storage device 155 may be a local device (e.g., 155-1) within the MDU 102 or a cloud storage device (e.g., 155-2) connected to the communications network 105. The copy of the content stored in the storage device 155 is accessible by the UEs 110 via the router 130 (e.g., through LAN streaming) or via the communications network 105 through network streaming. Examples of the recording device 150 include but are not limited to Digital Video Recorder (DVR), Network Video Recorder (NVR), Video On Demand (VOD) server, media server, cloud-based recording service.

In some embodiments, the recording device 150 is a smart edge server located within the MDU 102 and close to the UEs 110. The smart edge server is configured to record contents and stored the recorded contents locally at the edge (i.e., the MDU 102) of the network. Smart edge servers can be used to reduce latency and improve performance for applications that require real-time or near-real-time data processing within the MDU 102.

In some embodiments, the MDU gateway device 160 is in connection with a head end (not shown) separate from the MDU gateway device 160 and is configured to receive content from the content provider 180 via the head end. The recording device 150 may be included in the MDU gateway device 160 or configured as an internal device/function of the MDU gateway device 160.

Figure 2:
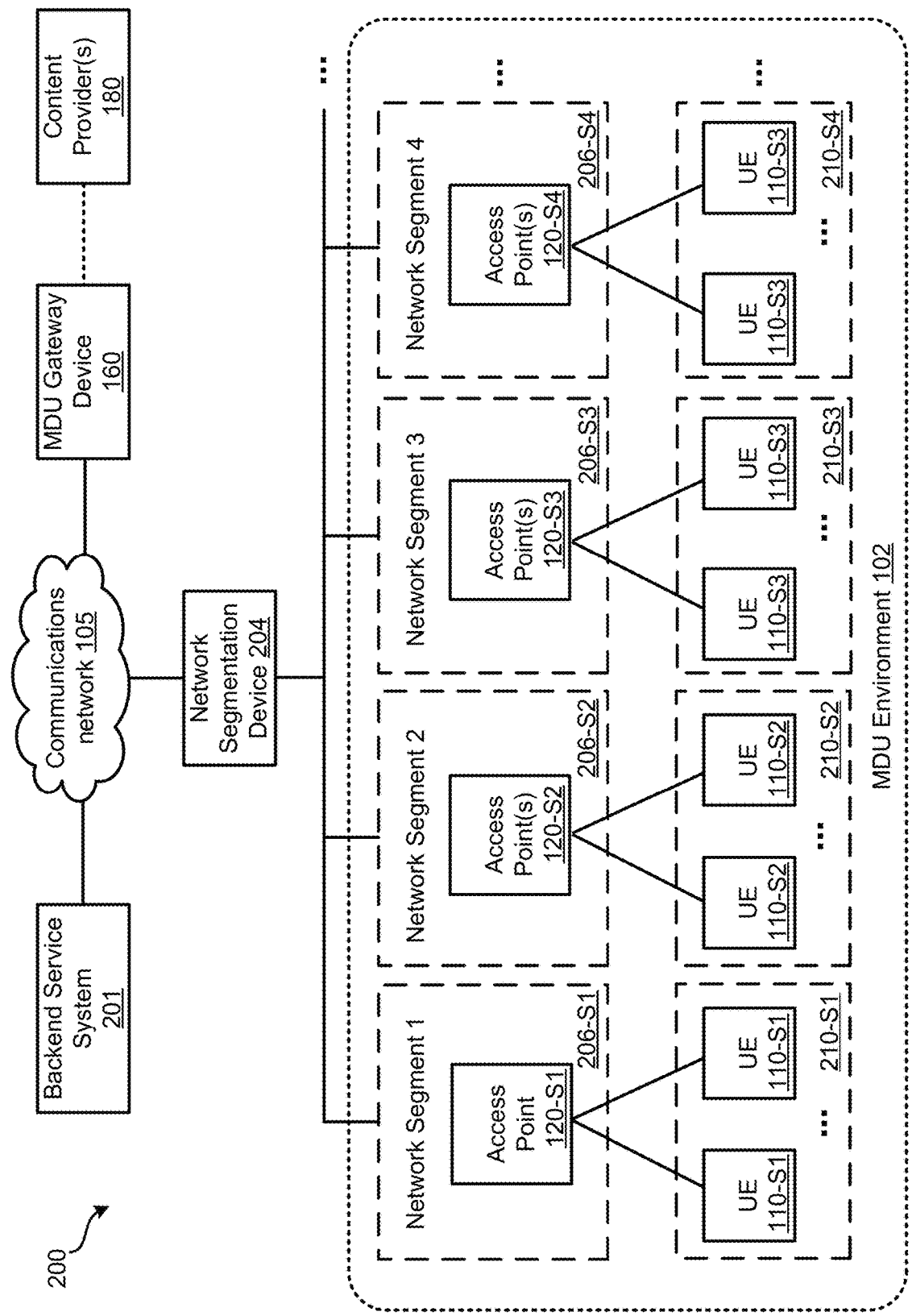
FIG. 2 is a schematic diagram illustrating another example of a communications system according to various embodiments.

FIG. 2 is a schematic diagram illustrating another example of a communications system 200 (also referred to as "system 200") according to various embodiments. The system 200 is a variation of the system 100 and may include one or more component of the system 100. In the illustrated example, the system 200 includes, among other components, an MDU environment 102, a backend service system 201, a communications network 105, a MDU gateway device 160, one or more content providers 180, and a network segmentation device 204. The system 200 may include additional components and/or network functions.

The MDU environment 102 is divided into multiple zones 210 (e.g., a first zone 210-S1, a second zone 210-S2, a third zone 210-S3, a fourth zone 210-S4, etc.). In some embodiments, the MDU environment 102 may be divided geographically, and each zone 210 has a defined geographic boundary. Each zone 210 may include one or more units of the MDU, a common area, or a unit of a particular function. For example, when the MDU environment 102 represents a building, the zones 210 may represent different floors or areas within the building. When the MDU environment 102 represents a hotel, the zones 210 may represent different rooms or categories of rooms, such as standard guest rooms, premium guest rooms, lobby, lounge, swimming pool, dining area, gym, conference rooms, and so on.

The network segmentation device 204 is in connection with the communication network 105 and is configured to partition or divide the communication network 105 into multiple network segments 206 (e.g., a first network segment 206-S1, a second network segment 206-S2, a third network segment 206-S3, a fourth network segment 206-S4, etc.) respectively corresponding to the multiple zones 210 of the MDU environment 102. Each network segment 206 may have one or more access points 120 (e.g., a first access point 120-S1, a second access point 120-S2, a third access point 120-S3, a fourth access point 120-S4, etc.). The access points 120 are provided for the UEs 110 within each zone 210 to get access to the communications network 105. For example, UEs 110-S1 in the zone 210-S1 can access the network segment 1 (206-S1) via the access point 120-S1. Likewise, UEs 110-S2 in the zone 210-S2 can access the network segment 2 (206-S2) via the access point 120-S2; UEs 110-S3 in the zone 210-S3 can access the network segment 3 (206-S3) via the access point 120-S3, and so forth.

In some embodiments, the network segmentation device 204 is a router. The router may be configured and operable to perform the network segmentation by respectively routing the network traffics from the communications network 105 to the access point 120 of each network segment 206. Examples of the router and methods of network segmentation will be described below in details with references to FIG. 5.

The backend service system 201 is in connection with the communications network 105 and may be operated by the content provider 180, a streaming service provider that provides content streaming service to the MDU 102, or a third party. The backend service system 201 is configured to establish a network segmentation policy (also referred to as network policy or service segmentation policy) and store the network policy. According to the network policy, different streaming and content provisioning services are correspondingly designated to different network segments 206. For example, an MDU administrator (e.g., a MDU property or premises manager) may work with the Internet Service provider (ISP) to set up policies and restrictions based on the network segments 206. Certain network segments may be designated with a specific type of streaming or content provisioning service, while others may have access to a wider range of streaming service or content provisioning service. For example, each network segment may be designated with a specific list of channels for the users connected to the network segment to access. Each network segment may be designated with a specific level of Quality of Service (QoS) such as streaming bitrate and quality, a specific layout of user interface (e.g., user interface template), or specific user features (e.g., Pause on Live TV support, Time-Shifted Viewing, Playback Control, etc.). Deep packet inspection (DPI) technology may be used to analyze the content of network traffic and determine which network segments should have access to specific types of streaming content. Additionally, content filtering or blocking at the network segment level may be used to restrict access to certain types of content based on the type and function of the zones 210 according to the established network policy. Other factors such as the user experience level and user status (e.g., paid service or unpaid service, standard membership or premium membership, etc.) may also be considered in service segmentation. The network policy may be stored in a database in connection with the backend service system 201.

As one example, the MDU environment 102 represents a hotel building, which is divided into multiple zones 210. Each zone 210 may represent a category of rooms or areas depending on the size, amenities, location, view, occupancy capacity, function, etc. For example, The first zone 210-S1 may cover the lobby area, the second zone 210-S2 may cover the swimming pool and gym, the third zone 210-S3 may cover standard guest rooms, the fourth zone 210-S4 may cover premium guest rooms, and so forth. Each zone 210 is designated with specific streaming and content provisioning services through the corresponding network segment 206, according to the pre-established network policy as mentioned above. For example, the first zone 210-S1 may be designated with limited streaming services; the second zone 210-S2 may be designated with certain sport channels on the corresponding network segment 206-S2, and access to sport channels may not be provided to users not connected to the network segment 206-S2. The users connected to the fourth zone 210-S4 (covering premium guest rooms) may have broader access to streaming and content services compared with users connected to the third zone 210-S3 (covering standard guest rooms). In this arrangement, streaming service and content resources can be segmented and allocated among different network segments 206. Thus, user viewing experiences can be differentiated based on the network segmentation, and the overall network efficiency and performance may be improved.

Figure 3A:
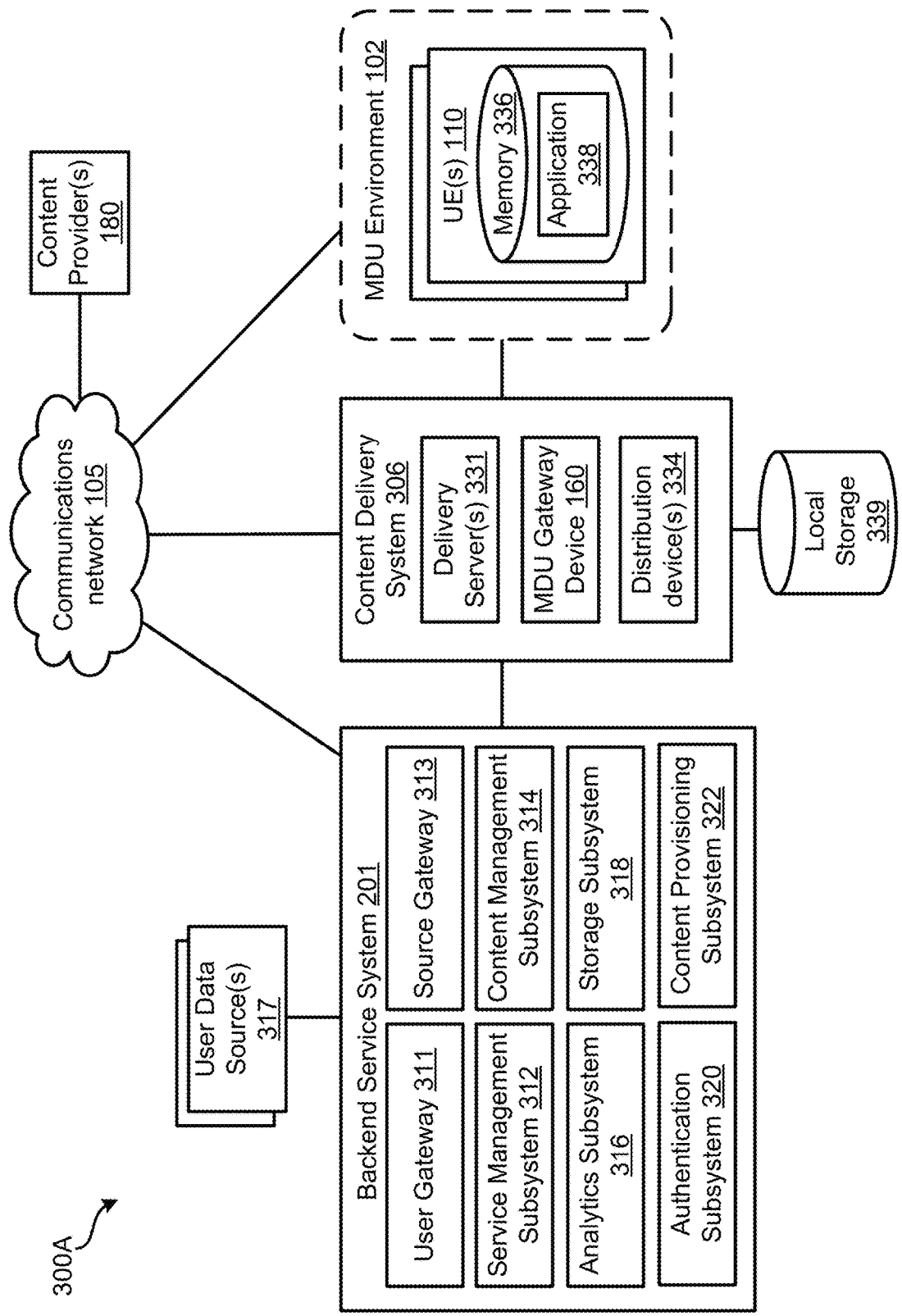
FIG. 3A is a schematic diagram illustrating another example of a communications system according to various embodiments.

FIG. 3A is a schematic diagram illustrating another example of a communications system 300A (also referred to as "system 300A") according to various embodiments. The system 300A is a variation of the system 100 and may include one or more component of the system 100. In the illustrated example, the system 300A includes, among other components, an MDU environment 102, a backend service system 201, a communications network 105, a content delivery system 306. Various components included in the system 300A may communicate with each other via the communications network 105. The system 300A may include additional components and/or network functions.

The backend service system 201 includes, among other components, a user gateway 311, a source gateway 313, a service management subsystem 312, a content management subsystem 314, an analytics subsystem 316, a storage subsystem 318, an authentication subsystem 320, and a content provisioning subsystem 322. The content delivery system 306 includes, among other components, one or more delivery servers 331, an MDU gateway device 160, and one or more distribution device(s) 334.

The media content can be transmitted to and received by a UE 110 of a group of UEs 110 in the MDU environment 102. The UE 110 can consume the content as part of a presentation that is individual or as part of a presentation involving multiple parties. Regardless of its type a presentation can take place within a session to consume content. Such a session can include, for example, a call session, videoconference, a watch party, a downstream lecture, a broadcast in a common area of the MDU, such as a seminar, a class, a tutorial, or the like, for example.

The UE 110 may have a particular amount of computing resources (e.g., processing resources, memory resources, networking resources, and I/O elements) to play/stream/ present media content via a presentation. In some cases, the UE 110 can be user devices of a particular type, such as high-end to medium-end mobile devices or wearable devices. A mobile device can be embodied in, for example, a handheld portable device (e.g., a smartphone, a tablet, or a gaming console); a non-handheld portable device (e.g., a laptop); a tethered device (such as a personal computer). A wearable device can be embodied in goggles (such as augmented-reality (AR) goggles), for example.

To stream media content, a UE 110 can execute a client application 338 retained in a memory device 336 that can be present in the UE 110. A processor (not shown in FIG. 2A) integrated into the UE 110 can execute the client application 338. The client application 338 can include a mobile application or a web browser, for example. Execution of the client application 338 can cause initiation of a streaming session. Accordingly, execution of the client application 338 can result in the exchange of data and/or signaling with the backend service system 201 via a user gateway 307 included in the backend service system 201. The UE 110 and the user gateway 311 can be functionally coupled by the communications network 105. Specifically, the UE 110 can receive data defining the media content. Such data can be embodied in one or multiple streams defining respective elements of the media content. For instance, a first stream can define imaging data corresponding to video content, and a second stream can define audio data corresponding to an audio channel of the media content. In some cases, a third stream defining haptic data also can be received. The haptic data can dictate elements of 4D content or another type of immersive content.

The user gateway 311 can directly communicate with the UE 110 and provide data defining the media content by communicating with the content delivery system 306. In some embodiments, the user gateway 311 can receive user information from the UE 110. For example, the user information can include user onboarding information, a user request for content streaming service or content resource, user authentication information, and so on. The content provisioning subsystem 322 is in connection with the content delivery system 306 and can provide content streaming service, in response to a user request, to the authenticated and authorized UE 110 via the user gateway 311 and the content delivery system 306. In some embodiments, a request or instruction for content delivery is generated by the content provisioning subsystem 322 and sent to the content delivery system 306, and the content delivery system 306 delivers media content to the UE 110 according to the instruction.

The authentication subsystem 320 can manage authentication, authorization, and accounting of the user of the MDU. In some embodiments, the authentication subsystem 320 can automatically retrieve user registration information, for example, user profiles stored in the storage subsystem 318 upon a user request for content streaming service. The authentication subsystem 320 can perform the authentication process to authenticate the onboarding user prior to delivery of media content to the user.

The content delivery system 306 may employ a content delivery network (CDN) to retrieve content from a content provider 180 and deliver the content to the UE 110 according to the request/instruction. In some embodiments, one or more delivery servers 321 included in the content delivery system 306 can have a local instance of media content to be provided to the UE 110. The local instance of media content can be obtained from one or several local storage devices 339, where each one of the local storage devices 339 contain media assets. Such media assets can be static and can be consumed in time-shifted fashion. The media assets can include, for example, a video segment, a webcast, an RSS feed, or another type of media content that can be streamed by the user gateway 311 and/or other devices of the backend service system 201. The media assets are not limited to media content that can be streamed. In some cases, at least some of the media assets can include static media content, such as an image or a document. In some embodiments, the media assets include a recording of a content item that can be shared by the users of the MDU 102 (also referred to as a "shared recording"). In some embodiments, the MDU gateway device 160 of the content delivery system may retrieve an identified media assets stored in the local storage device 339 and deliver the identified media assets to the UE 110 according to the instruction sent from the backend service system 201.

The source gateway 313 serves as an entry point for incoming data, information, or request from external sources such as user data sources 317. The source gateway 313 is configured to receive incoming data, information, or request, and transfer the data to other subsystems of the backend service system 201. In some embodiments, the user data source 317 may be associated with a data center of a management system of the MDU 102. The user data source 317 can provide user data or information related to the MDU, such as user identity, MDU account information, user registration data, and so on. In some embodiments, the user data source 317 may be associated with content provider(s) 180, such as a commercial content streaming service provider. The user data source 317 may include user viewership data and user analytics data, etc. In some embodiments, the user data source 317 is operated by the MDU management. In some embodiments, the data source is operated by a third party that is different from the operator of the backend service system 201. In some embodiments, the user data source 317 is associated with a hospitality property management system platform 401 shown in FIG. 4, which will be described in detail below.

The user gateway 311 is in connection with the particular delivery server 331, which can provide media content to the UE 110 in response to a user request for content. In some embodiments, the backend service system 201 can retrieve the requested media content from the content provider 180 and send the media content to the UE 110 through the user gateway 311 and the content delivery system 306. The user gateway 311 can send the media content according to one of several communication protocols (e.g., IPv4 or IPv6, for example). In some embodiments, the delivery server 331 can retrieve media content requested by the user directly from the local storage device 339 according to the instruction from the backend service system 201 and send the media content to the UE 110 through the MDU gateway device 160 and the distribution device 334.

In some embodiments, the media content that is available to a UE 110 or set of multiple UE 110 can be configured by content management subsystem 314. To that end, the content management subsystem 314 can identify corpora of media content applicable to the UE 110. Execution of the client application 338 can result in access to a specific corpus of media content based on attributes of the UE 110 or a combination of the set of multiple UE 110. In some embodiments, the content management subsystem 314 can configure one or more functions to interact with media content. Those function(s) can include, for example, one or a combination of translation functionality (automated or otherwise), social-media distribution, formatting functionality, or the like.

The analytics subsystem 316 can generate intelligence and/or knowledge about user registration information, user features, attributes, interests, and characteristics, user viewing preferences, content consumption behavior of a user device (e.g., one of the UE 110), etc. The analytics subsystem 316 can retain the intelligence and/or knowledge in a storage subsystem 318. In some embodiments, the intelligence and knowledge may include the user registration information related to MDU, such as username, MDU membership, user registration number, MDU booking (reservation) number and type, one or more user identities related to the user, MDU account information of the user, user experience level, and so on. The analytics subsystem 316 may process the user registration information related to MDU and extract one or more user features therefrom.

In some embodiments, the intelligence and knowledge can be generated using historical user activity data identifying one or different types of viewer activities and user behaviors related to the UE 110. The user activities can be related to consumption of media content. In some configurations, the client application 338 can send user activity data during consumption of media content. The activity data can identify an interaction or a combination of interactions of the UE 110 with the media content. An example of an interaction is trick play (e.g., fast-forward or rewind) of the media content. Another example of an interaction is reiterated playback of the media content. Another example of an interaction is aborted playback. e.g., playback that is terminated before the endpoint of the digital content. Yet another example of the interaction is submission of the media content to a user account in a social media platform. Yet another example of the user activity is the video recording behavior of the user on the user device. Thus, the activity data can characterize engagement with the media content.

In some embodiments, the user activity data is supplied by a third party (e.g., a commercial content provider) to which the user subscribes to. The user activity data may be received on the backend service system 201 via the source gateway 313 and stored in the storage subsystem 318. In some embodiments, the user activity data provided by the content provider may include DVR analytics data related to the user, including favorite channel list, viewing history information, type of show watched within a predetermined time period, genre of movies watched within a predetermined time period, number of recordings scheduled by the user, number of recordings completed by the user, number of recordings deleted by the user, amount of storage space used by the user, average length of recordings by the user, time of day when the user schedules most recordings, most commonly recorded shows or channels by the user.

The analytics subsystem 316 may process the user activity data and extract one or more features therefrom. In some embodiments, one or more features can be extracted from a combination of the user registration data and user activity data.

In some embodiments, the analytics subsystem 316 can utilize the user activity data to assess a degree of interest of the user on the media content (e.g., media assets). In some embodiments, the analytics subsystem 316 can train a machine learning model to discern a degree of interest on media content among multiple interest levels. The machine learning model can be trained using unsupervised training, for example, and multiple features determined using media content and the user activity data. By applying the trained machine learning model to new activity data, a user interest (attribute, feature, or characteristic) can be generated. A user feature (attribute, interest, or characteristic) may represent one of the multiple interest levels and, thus, quantifies interest on the media content on part of the user.

By evaluating the user information, interest, attribute, feature, or characteristic of a user of MDU on different types of media content, the analytics subsystem 316 can generate a user profile for the user. Such an evaluation can be implemented for multiple users of the MDU and therefore multiple user profiles can be generated. The analytics subsystem 316 may further group the multiple users based on a common user feature (attribute, interest, or characteristic) shared among users. Multiple user segments profiles may be generated, each user segment profile including a list of users sharing at least one common user feature (attribute, interest, or characteristic). The user profiles and user segment profiles may be stored in a database included in the storage subsystem 318.

Figure 3B:
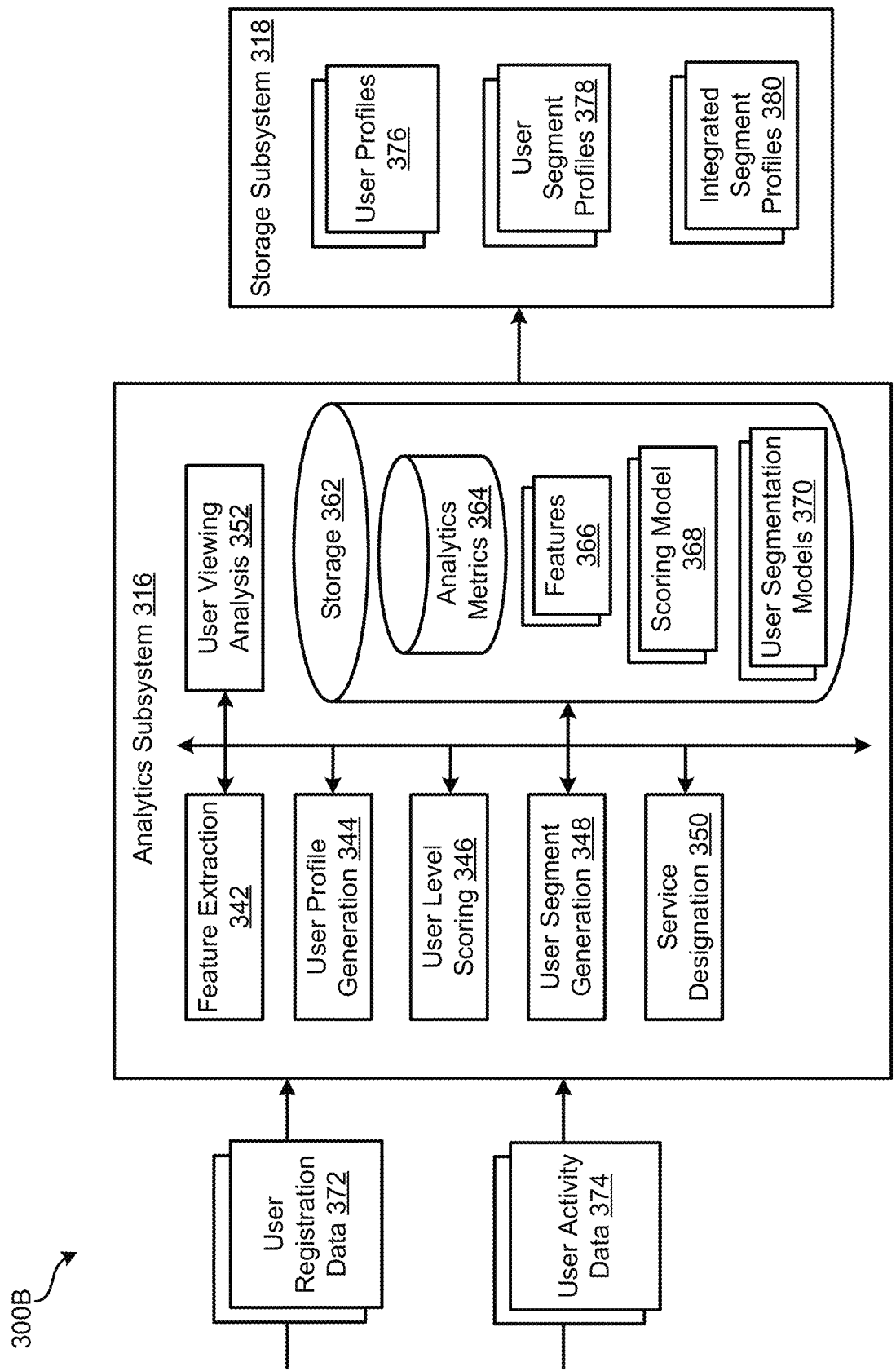
FIG. 3B is a schematic diagram illustrating another example of a communications system according to various embodiments.

FIG. 3B is a schematic diagram illustrating an example of a communications system 300B (also referred to as "system 300B") including the analytics subsystem 316 and the storage subsystem 318 of the backend service system 201. The system 300B may include additional components and/or functions. As shown in FIG. 3B, the analytics subsystem 316 includes, among other components, a feature extraction unit 342, a user profile generation unit 344, a user level scoring unit 346, a user segment generation unit 348, service designation unit 350, a user viewing analysis unit 352, and a storage 362.

The analytics subsystem 316 can receive user registration data 372 and user activity data 374 from external user data sources 317 as mentioned above. The feature extraction unit 342 is configured to extract a user feature 366 from the user registration data 372 and user activity data 374. In some embodiments, the feature extraction unit 342 can preprocess the user registration data 372 and user activity data 374 to transform and integrate the data. The feature extraction unit 342 can select a subset of relevant features that can capture the user's behavior and preferences based on the user's personal information or identities (e.g., age, gender, ethnicity, location, socio-economic level, user experience level, user characteristics such as internal/external or employee/guest, MDU membership level, etc.) and engineer the features to create a new user feature in compliance with a standard format. The extracted user features can be represented in a format that can be used as input to machine learning models. For example, a feature vector may be created corresponding to a dimension in the vector.

The user viewing analysis unit 352 is configured to analyze the user activity data 374 to facilitate the extraction of user features from user viewing preference. In some embodiments, the user viewing analysis unit 352 can use certain analytical metrics 364 stored in the storage 362 to measure the user activity. The certain analytical metrics 364 may include viewing history, time spent, ratings and reviews, search queries, watchlist and favorite list, clickstream, recording history, to name a few. Additional metrics may also be included in the analytical metrics.

For example, viewing history can be used to measure the types of content that the user has viewed in the past, including the genre, format, language, and duration of the content. Time spent can be used to measure the amount of time that the user spends watching a particular type of content, such as movies, TV shows, or sports. Ratings and reviews can be used to measure the ratings and reviews that the user has given to different types of content, indicating their level of interest and engagement. Search queries can be used to measure the keywords and phrases that the user has used when searching for content, providing insights into their interests and preferences. Watchlist and favorite list can be used to measure the content that the user has added to their watchlist or favorite list, indicating their future viewing preferences. Clickstream data can be used to measure the user's clicks and navigation behavior on the platform, indicating their preferences and interests. Recording history can be used to measure the user's recording behavior on the platform, indicating their watch and record habit. The feature extraction unit 342 can generate one or more features of user viewing preference based on these measurements provided by user viewing analysis unit 352. The user features 366 generated by the feature extraction unit 342 can be stored in the storage 362.

Figure 3D:
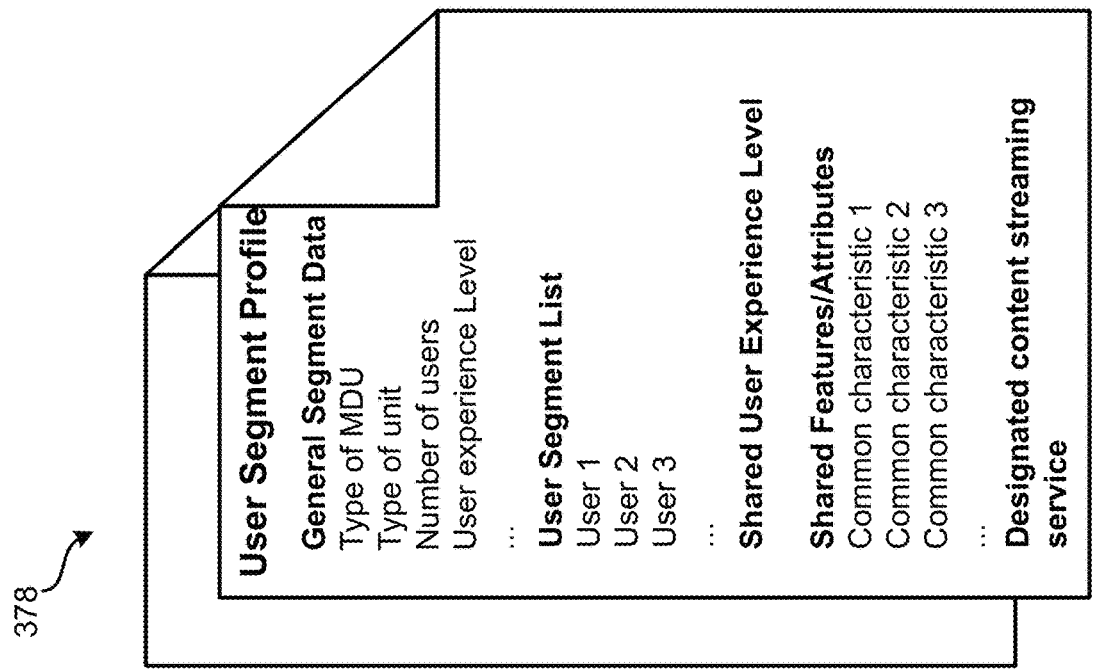
FIG. 3D illustrates an example of a user segment profile according to various embodiments.
Figure 3C:
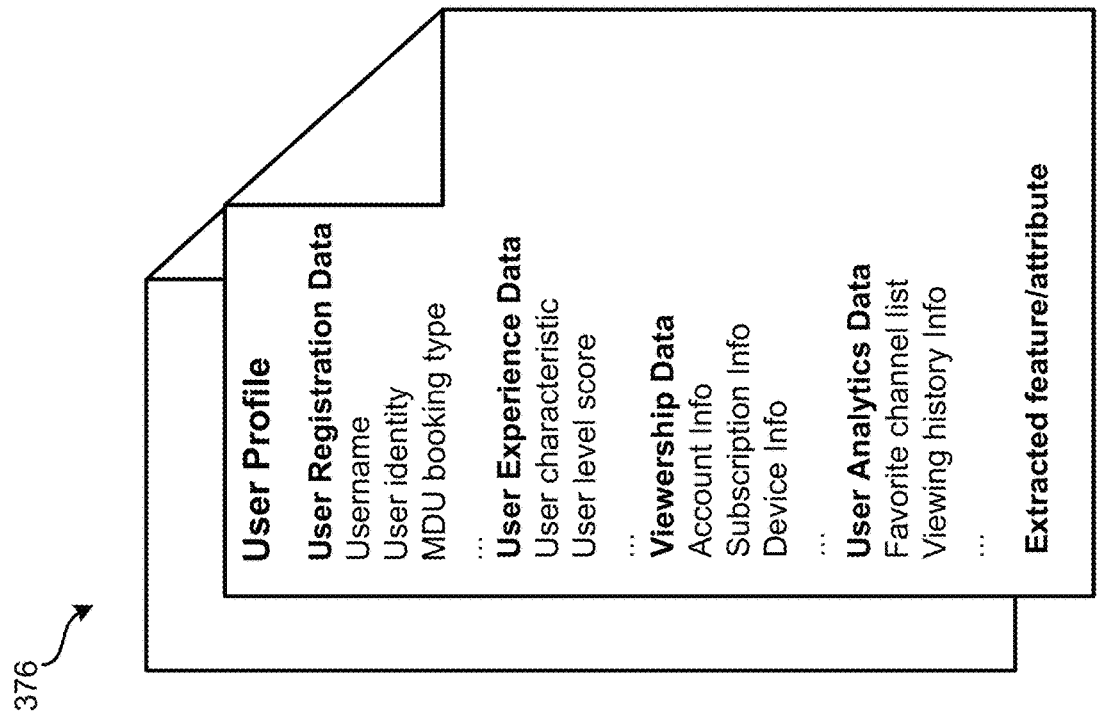
FIG. 3C illustrates an example of a user profile according to various embodiments.

The user profile generation unit 344 is configured to generate a user profile 376 for a user of the MDU. The user profile may include any data related to the user and received, processed, analyzed, and generated by the backend service system 201. Multiple user profiles 376 may be generated for multiple users of the MDU. An example of user profile 376 is shown in FIG. 3C. In the illustrated example, the user profile 376 includes, among other data, user registration data, user experience data, viewership data, user analytics data, and one or more extracted features/attributes of the user. The user registration data may include username, contact information, registration email address, user identities, move-in or log-in date, access credentials, MDU unit type, booking/reservation type, paid/unpaid status, room or unit numbers, check-in and check-out dates, billing information, and so on. The user experience data may include identification status of the user (e.g., internal staff of the MDU, employee, management personnel, MDU membership, seniority of the user, guest experience level such as paid guest, non-paid guest, standard room guest, premium room guest, etc.). The viewership data may include the user's information related to the content streaming service provider, such as streaming service account information, subscription information, device information, etc. The user analytics data may include information related to past content streaming services provided and consumed by the user, such as channel preferences and frequency of the viewing, program preferences including genres, language, and time of day, viewing history including which programs the user has watched, how long time the user has watched them for, and whether user has paused or skipped through sections of the program, ratings and reviews, and other types of user activity data generated by the user viewing analysis unit 352.

The user level scoring unit 346 is configured to evaluate each user profile and generate a user level score. The user level score may represent the user experience level. In some embodiments, the user level scoring unit 346 can generate a user level scoring model 368 by selecting and identifying the user features 366 that are relevant to the user level score, assigning weights to the features based on their relative importance in calculating the user level score, determining the scoring algorithm such as a linear regression model, a decision tree, or a neural network, depending on the complexity of the scoring model, and testing and validating the model. The model can be used to generate a user level score for each user of the MDU. The user level score may be included in the user experience data of the user profile 376 (FIG. 3C).

The user segment generation unit 348 is configured to group the users based on the user profiles and data included therein and generate multiple user segment profiles 378 corresponding to multiple user segments. An example of user segment profile 378 is shown in FIG. 3D. In the illustrated example, the user segment profile 378 includes, among other data, general user segment data, a user segment list, shared user experience level data, and shared user features/attributes data. The general user segment data includes the type of MDU, type of unit common to the users in the user segment, number of users in the user segment, a common level or range of user experience, etc. The user segment list includes the user identities of the users belonging to the same user segment. The shared user experience level may include a common range of user level score shared by the users belonging to the same user segment. The shared user features may include one or more common characteristics, interests, and attributes of the users belonging to the same user segment.

In some embodiments, the user segment generation unit 348 is configured to generate multiple integrated user-network segment profiles 380 (also referred to as "integrated segment profiles"). The integrated user-network segment profile 380 is based on an integration of network segmentation and user segmentation and is configured to provide a holistic and comprehensive record of the user information, user viewing preferences, common user feature and characteristics, common user interests, and personalized streaming services and content resources that are designated to each network segment for each user segment of the integrated segment profile 380.

Figure 3E:
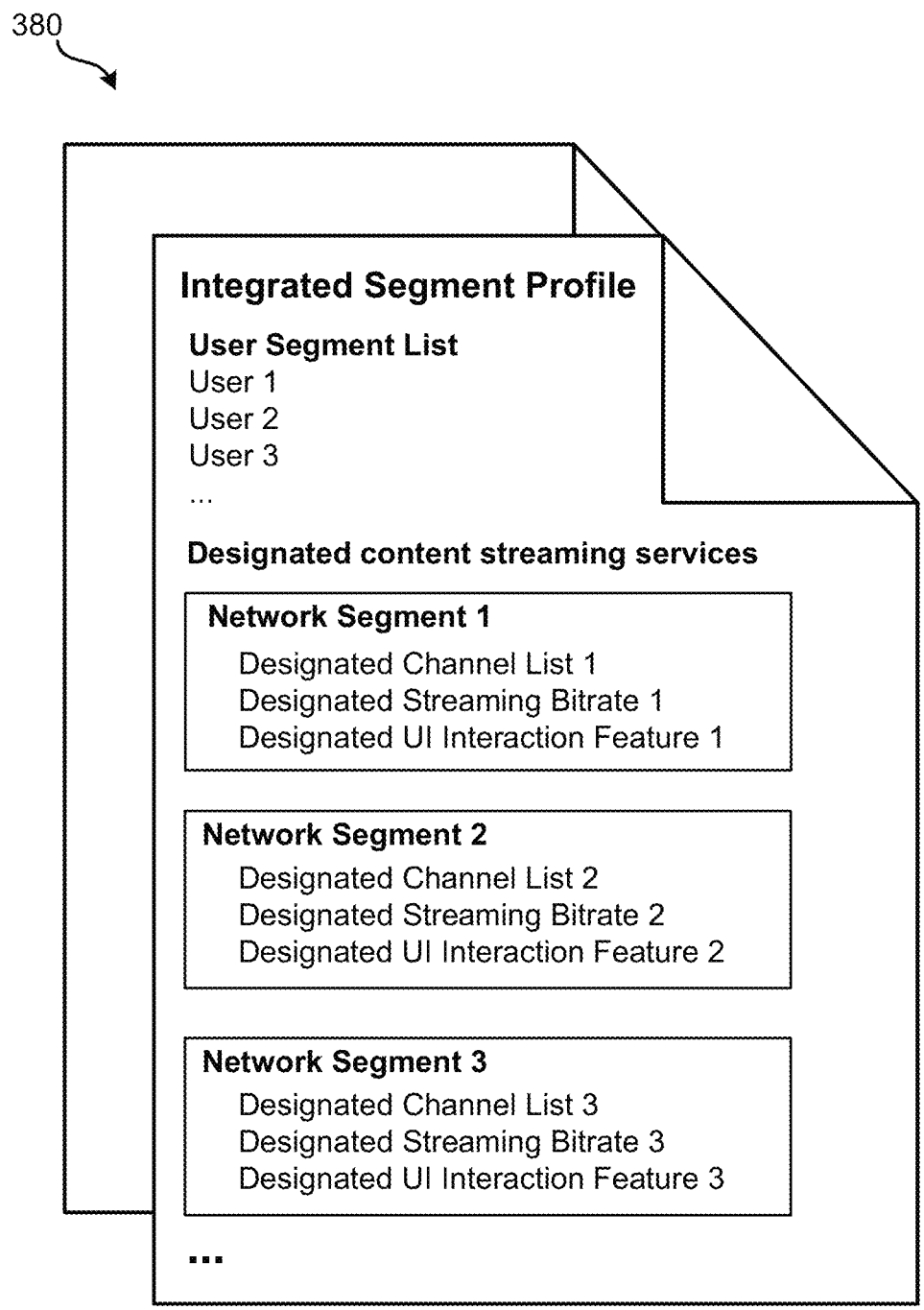
FIG. 3E illustrates an example of an integrated user-network segment profile according to various embodiments.

An example of integrated segment profile 380 is shown in FIG. 3E. In the illustrated example, the integrated segment profile 380 includes, among other data, general user segment data, a user segment list, shared user experience level data, shared user features/attributes data, network segmentation data, and designated streaming services and content resources for each network segment. Similar to the user segment profile 378, the general user segment data includes the type of MDU, type of unit common to the users in the user segment, number of users in the user segment, a common level or range of user experience, etc. The user segment list includes the user identities of the users belonging to the same user segment. The shared user experience level may include a common range of user level score shared by the users belonging to the same user segment. The shared user features may include one or more common characteristics, interests, and attributes of the users belonging to the same user segment. In addition, the integrated segment profile 380 includes network segmentation data and streaming services and content resources designed to each network segment. For example, the integrated segment profile 380 may include data about particular streaming services and content resources such as a particular channel list and channel programs thereof, a particular level of QoS such as streaming bitrate and quality, and/or a particular UI template or particular UI interaction features designated to each one of the multiple network segments (e.g., network segment 1 (206-S1), network segment 2 (206-S2), network segment 3 (206-S3), etc.) of the MDU environment 102. The particular streaming services and content resources may be designated to a particular network segment of a particular integrated segment profile, based on the common user features and the common user experience level of the users belonging to the particular integrated segment profile as well as the pre-established network policy of the MDU environment 102 that regulates the network segments thereof.

By combining user segmentation and network segmentation, the integrated segment profile enables a comprehensive understanding of users' content consumption patterns while taking into consideration the constraints and capabilities of their network segment. The integrated segment profile allows for personalized content recommendations and service differentiation that are tailored not only to individual user preferences but also to the specific network segment they are connected to. By leveraging the integrated segment profile, content providers can further improve optimization of content delivery, allocation of content resources, differentiation of streaming services, and provide a more seamless, diversified, and personalized user experience across diverse user and network segments.

In some embodiments, the user segment generation unit 348 may employ a user segmentation model 370 stored in the storage 362 to perform user segmentation. The user segmentation model 370 may be an analytical framework that leverages data included in the user profiles 376 to group users with common features, common user experience level, common characteristics, or any combinations, into multiple user segments. In some embodiments, the user segmentation model 370 can assign weights to the features or analytical metrics selected by the model. In some embodiments, each user segment may include multiple sub-segments, and each sub-segment is a subdivision of the user segment based on additional criteria or characteristics that differentiate the users within the user segment.

In one example, the MDU is a hotel, and users of the MDU can be grouped into multiple user segments. A first user segment may include MDU employees and staffs, MDU property managers, and other internal users of the MDU. The first user segment may further include multiple sub-segments to represent users of different functions such as gym, lounge, front desk, swimming pool, maintenance and facility, etc. A second user segment may include guest users or external users. The second user segment may further include multiple sub-segments to represent users of different user experience levels such as users with premium membership, users with standard membership. Additionally or alternatively, the users may be divided into segments sub-segments by their guest room booking types such as luxury guest rooms, premium guest rooms, standard guest rooms, etc. In some embodiments, the users may be divided into segments or sub-segments by their user devices, such as luxury user devices, premium user devices, portable user devices, etc.

In another example, the MDU 102 is a hotel, and the users of the hotel are guests. The guests may be divided into multiple user segments or sub-segments by travel purposes of the guests to respectively represent business travelers, families with children, international travelers, and leisure travelers, among others. The business travelers segment includes users who are traveling for business purposes and share preferences on news, financial content, and educational channel or programming. Families with children segment include users who are traveling with their families and have children, tend to have a longer length of stay, and prefer children's channel and programming, family-oriented movies, and educational content. International traveler segment may include users who are traveling from different countries and have a language preference, tend to have a longer length of stay, and prefer content in their native language. Leisure traveler segment may include users who are traveling for leisure purposes, tend to have a longer length of stay, and prefer entertainment programming, movies, and sports content. In this way, each user segment has unique characteristics and preferences shared by the users within that segment, allowing the content streaming service to tailor the content offerings to the users from each user segment.

The service designation unit 350 is configured to designate different content streaming services and/or content resources to different user segments based on a pre-defined rule or policy. In some embodiments, content streaming services may be differentiated based on the common user experience level (or the common range of the user level sores) shared by the users belonging to the same user segment. In some embodiments, content streaming services may be differentiated based on the common interest, attribute, feature, or characteristics shared by the users belonging to the same user segment. The designated content streaming service to a particular user segment may also be included in the user segment profile corresponding to that user segment. In some embodiments, the content streaming services are differentiated by creating a particular channel list for each user segment. In some embodiments, the content streaming services are differentiated by setting a particular range of steaming bitrate or a specific level of quality of service (QOS) for each user segment. In some embodiments, the content resources are differentiated by creating a particular list of recordings to be shared by the users of a particular user segment. Other ways of service differentiation are also within the scope of the present disclosure. In some embodiments, the service designation unit 350 may designate streaming services and content resources to each sub-segment of the same user segment profile 378 or integrated segment profile 380.

In some embodiments, the service designation unit 350 may designate streaming services and content resources to each network segment associated with the same integrated segment profile 380, based on the pre-established network policy. As an example, the MDU 102 is a hotel, and multiple network segments are generated corresponding to a particular zone of the MDU 102 (e.g., network segment 1 for standard guest room building, network segment 2 for lobby, network segment 3 for swimming pool, network segment 4 for gym, etc.). An integrated segment profile 380 may be generated based on the common user experience level (e.g., luxury, premium, or standard hotel membership). For example, the integrated segment profile 380 may include a list of users who are standard guests (i.e., standard guest room customers). The integrated segment profile 380 may further include data/information about the streaming services and content resources designated to each network segment for the users belonging to or associated with the integrated segment profile 380 to access when the UE 110 of the user is connected to the network segment of the MDU 102. For example, when a user belonging to the integrated segment profile 380 is connected to network segment 1 (i.e., covering the standard guest room building), the user may access the streaming services and content resources designated to network segment 1, according to the integrated segment profile 380. In this way, the user segmentation and network segmentation are combined to provide more enhanced service personalization to MDU users.

Figure 4:
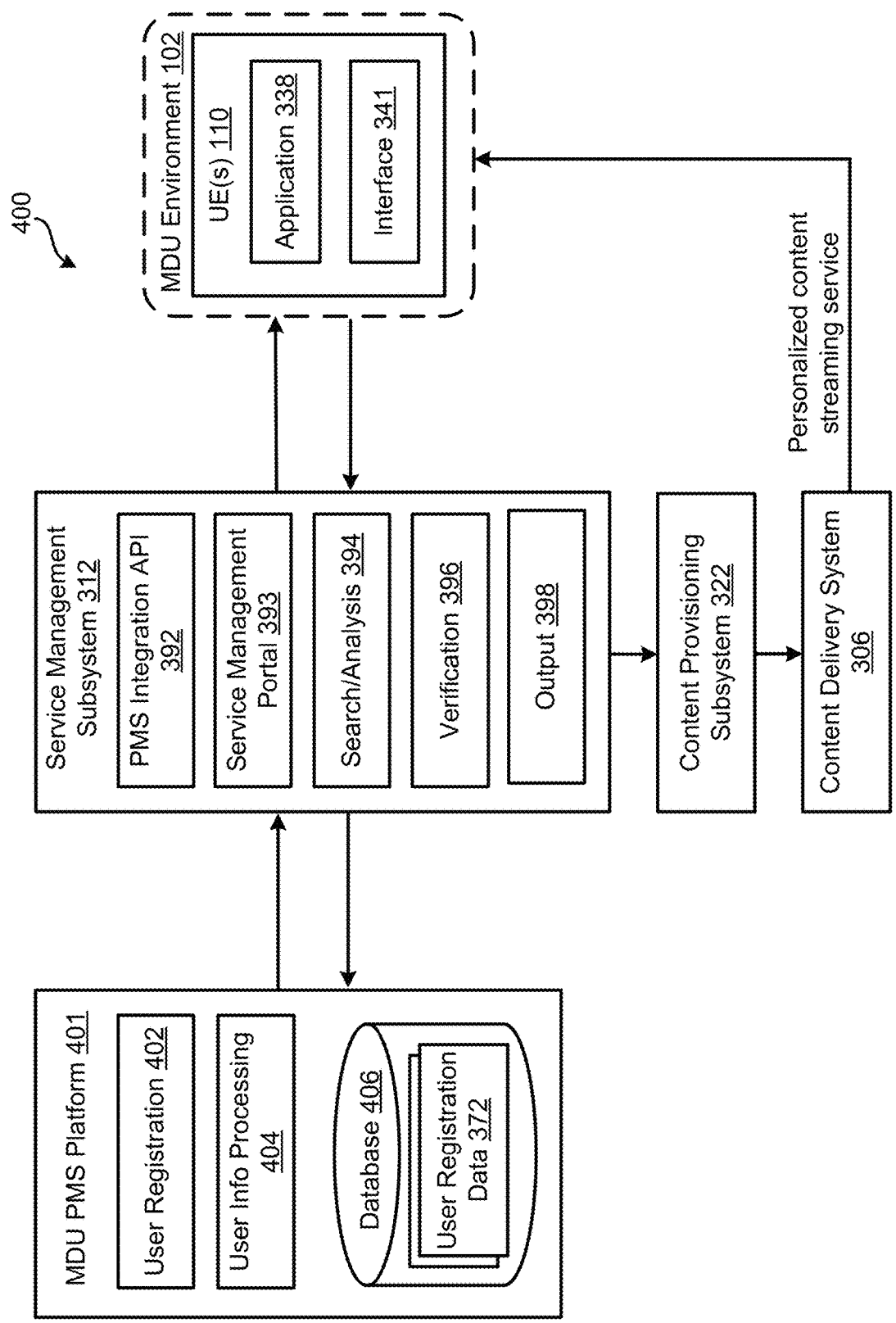
FIG. 4 illustrates a schematic diagram illustrating another example of a communications system according to various embodiments.

FIG. 4 is a schematic diagram illustrating another example of a communications system 400 (also referred to as "system 400") according to various embodiments. In the illustrated example, the system 400 includes, among other components, an MDU property management solution platform 401 (also referred to as "MDU PMS platform" or "hospitality PMS platform"), the service management subsystem 312 and content provisioning UE 110 in the MDU environment 102.

The MDU PMS platform 401 can serve as a user data source (e.g., the user data source 317 of FIG. 3A) and provide user registration data or other user information related to the MDU for the backend service system 201. In some embodiments, the MDU PMS platform 401 includes, among other components, a user registration unit 402, a user information processing unit 404, and a database 406. The user registration unit 402 may include multiple modules, for example, a reservation module configured to manage reservations and bookings, a front desk module configured to manage guest user check-in, check-out, and management, a housekeeping module configured to track and manage room cleaning and maintenance, an accounting module configured to manage user account, billing, payments. The multiple modules of the user registration unit 402 can receive various user information related to the MDU.

The user information processing unit 404 is configured to process information related to users (i.e., guests or residents) of the MDU 102. The user information processing unit 404 serves as a centralized hub for user information and is responsible for generating, formalizing, and managing user registration data 372. The formalized user registration data 372 is stored in the database 406. The PMS manager or MDU administrator can access and update the user registration data through a management portal or user interface of the MDU PMS platform 401.

The service management subsystem 312 of the backend service system 201 is in communication with the MDU PMS platform 401 and may include a PMS integration application programming interface (PMS integration API) 392, a service management portal 393, a search and analysis unit 394, a verification unit 396, and an output unit 398. The PMS integration API 392 is used to facilitate communication and data exchange between the MDU PMS platform 401 and the service management subsystem 312. PMS integration API 392 may provide a set of defined protocols, standards, and tools for external software applications of the MDU PMS platform 401 that can interact with the backend service system 201. In some embodiments, a request for user registration data may be sent from the service management subsystem 312 to the MDU PMS platform 401. In response, the user registration data 372 is received on the service management subsystem 312 via the PMS integration API 392.

The service management portal 393 is configured to facilitate communication and data/information exchange between the service management subsystem 312 and the UE 110 of the MDU 102. In some embodiments, the service management portal 393 may expose an API that allows the UE 110 to send information to the service management subsystem 312 according to an agreed-upon communication protocol. Alternatively, such communication may be facilitated through use of web services. For example, the service management portal 393 may expose a web service that the user interface 341 of the UE 110 can consume to send and receive data, according to a standard web service protocol. In some embodiments, a request for user information is sent from the service management subsystem 312 to the UE 110. In response, the user may provide user information through the user interface 341 and the user information may be sent to the service management subsystem 312 through the service management portal 393.

The search and analysis unit 394 is configured to search the storage subsystem 318 to locate a user profile and/or a user segment profile related to a user. In some embodiments, the search and analysis unit 394 may determine presence or absence of a user profile and/or user segment profile related to a user in the storage subsystem 318. In addition, the search and analysis unit 394 may compare the user information provided by the UE 110 and the user information included in the identified user profile and/or user segment profile to determine presence or absence of a match. The verification unit 396 is configured to verify the user, upon identification of a mismatch of the user information. A verification request may be sent to the MDU PMS platform 401 for verifying the user registration data related to the user. A verification request may also be sent to the UE 110 for verifying the user identity. The output unit 398 is configured to generate a response to the user request, a request for user registration data, and a request for user information. The output unit 398 is also configured to generate an instruction and send the instruction to the content provisioning subsystem 322. The instruction includes the designated content streaming service to be provisioned to the user, according to the user segment profile to which the user is belonging. The content provisioning subsystem 322 can execute the instruction and provision the designated content streaming service to the UE 110 through content delivery system 306.

Figure 5A:
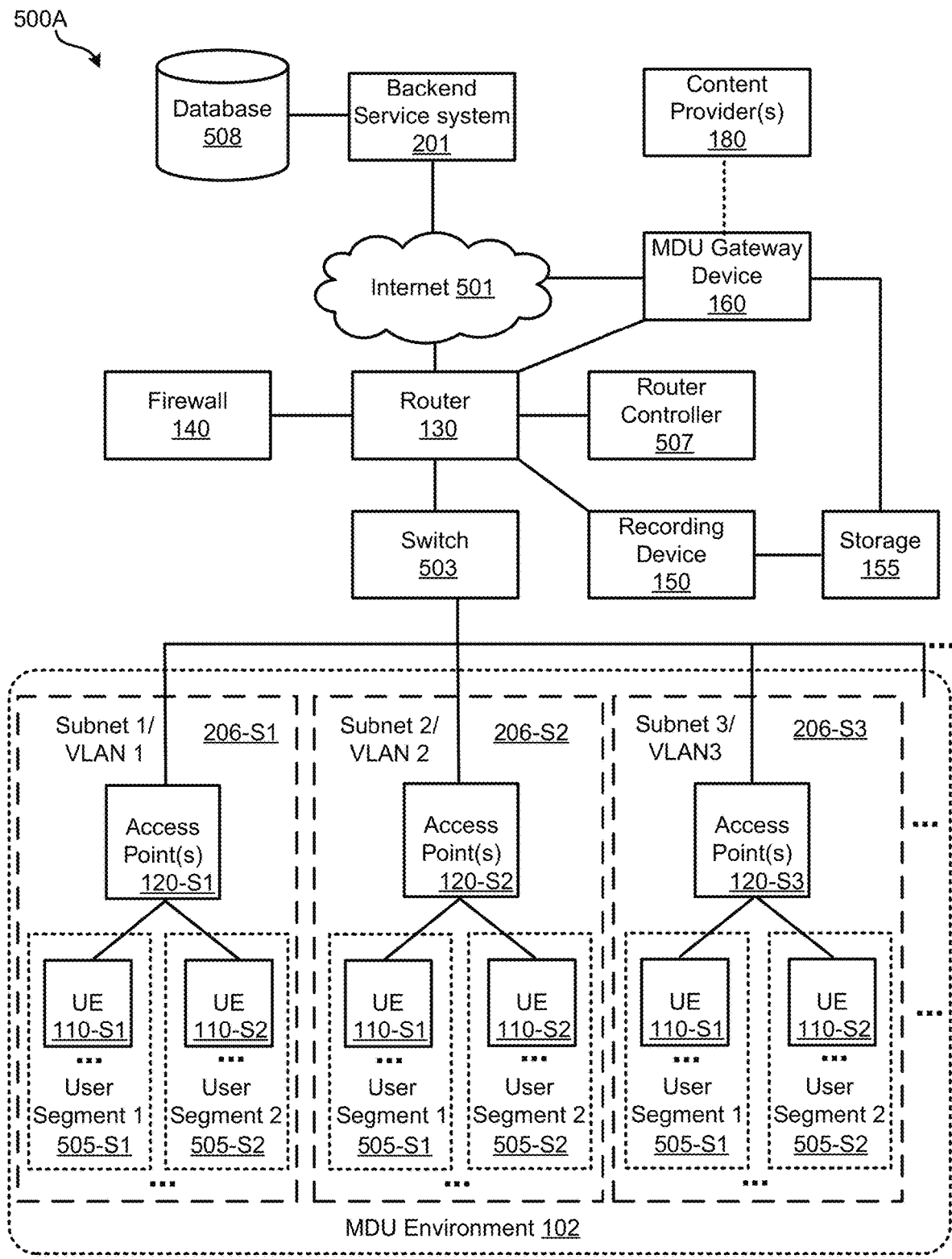
FIG. 5A illustrates a schematic diagram illustrating another example of a communications system according to various embodiments.

FIG. 5A is a schematic diagram illustrating another example of a communications system 500A (also referred to as "system 500A") according to various embodiments. The system 500A is a close variation of the systems 100 and may include one or more component of the systems 100. In the illustrated example, the system 500 includes, among other components, MDU environment 102, Internet 501, MDU gateway device 160, one or more content providers 180, backend service system 201, router 130, a switch 503, a router controller 507, access points 120, recording device 150, firewall 140, one or more storage devices 155, and a database 508. Similar components described above will not be repeated here unless otherwise indicated.

The MDU environment 102 includes multiple zones. Contents from the content provider 180 may be transferred over Internet 501 to the end user (e.g., UEs 110) in the zones of the MDU environment 102 and other components of the system 500. The UE 110 is in connection with the Internet 501 via access points 120. The router 130 is configured to route internet traffic (e.g., data communication that carries contents and streams) to various network segments. The switch 503 connected to the router 130 serves as a distribution point for the internet traffic coming from various devices. The switch 503 is configured to receive data packets from the MDU gateway device 160 and the UEs 110 and send the data packets to their intended destination. The switch 503 is also configured to learn the MAC addresses of the various devices connected thereto and store them in MAC address table. This helps the switch 503 to forward the data packets to the correct destination without flooding the network. The switch 503 can also be configured to prioritize certain types of internet traffic or to block certain types of traffic based on the pre-established network policy as well as the integrated user-network segment profile.

The router controller 507 may be a software or hardware or a combination of software and hardware that manages and controls the router 130 in the system 500. The router controller 507 provides a centralized interface for managing the MDU network, configuring the router 130, monitoring network traffic, and troubleshooting issues. The router controller 507 may include a user interface, which may be accessed through a web browser or dedicated software application, to allow the MDU administrator to perform tasks such as creating and managing network policies, configuring network settings, and viewing network statistics and logs.

In the illustrated example, Internet 501 for the MDU 102 is divided into multiple network segments 206 (e.g., network segment 206-S1, network segment 206-S2, network segment 206-S3, etc.) respectively corresponding to the multiple zones 210 (e.g., zone 210-S1, zone 210-S2, zone 210-S3, etc. as shown in FIG. 2) of the MDU 102. The network segments 206 may be in a form of a subnet (i.e., wide area network (WAN) or local area network (LAN)) or a virtual LAN (VLAN). Segmentation of Internet 501 may be performed using a subnetting approach or a VLAN approach. As mentioned above, different streaming services and content resources may be designated to each of the network segments 206, so that the users connected to a particular network segment 206 can get access to the particular streaming services or content resources designated to that network segment.

Upon receipt of a data packet of the content from the content provider, the router 130 is operable to determine which network segment the data packet is transferred to, according to the pre-established network policy. For example, if the content is designated to network segment 1 206-S1, the data packet is then routed to the access points 120-S1, and UE 110-S1 in the zone 210-S1 can receive the data packet via the access point 120-S1 and stream the content on the UE 110-S1.

The backend service system 201 is configured to provide a centralized platform for network management and user services, including management of user accounts, access rights, user authentication, UE eligibility determination, etc. The backend service system 201 may also be used to monitor network activity, provide security services, manage network resources such as bandwidth and IP addresses. The database 508 connected to the backend service system 201 is configured to store the MDU profile, user profiles, user segment profiles, integrated user-network segment profile, network policies, and other information regarding streaming service and content resource provisioning.

The recording device 150 is configured to record the content received by the MDU gateway device 160 and generate a copy of a content item (i.e., a recording of the content item). The recording may be stored in the storage device 155 for sharing among eligible users of the MDU 102. As described below, the network policy and the integrated user-network segment profile may specify the shared recordings designated to each network segment for a particular user segment according to the integrated segment profile. A UE of an authorized user may be connected to a network segment 206 and get access to the shared recording upon request. In some embodiments, one or more storage devices 155 may be used to store the shared recordings separately. Each zone 210 of the MDU 102 may be designated with a storage device 155 that stores the shared recordings designated to the network segment 206 corresponding to the zone 210. Alternatively or additionally, each user segment may be designated with a storage device 155 that stores the shared recordings designated to the particular user segment according to the user segment profile.

Figure 5B:
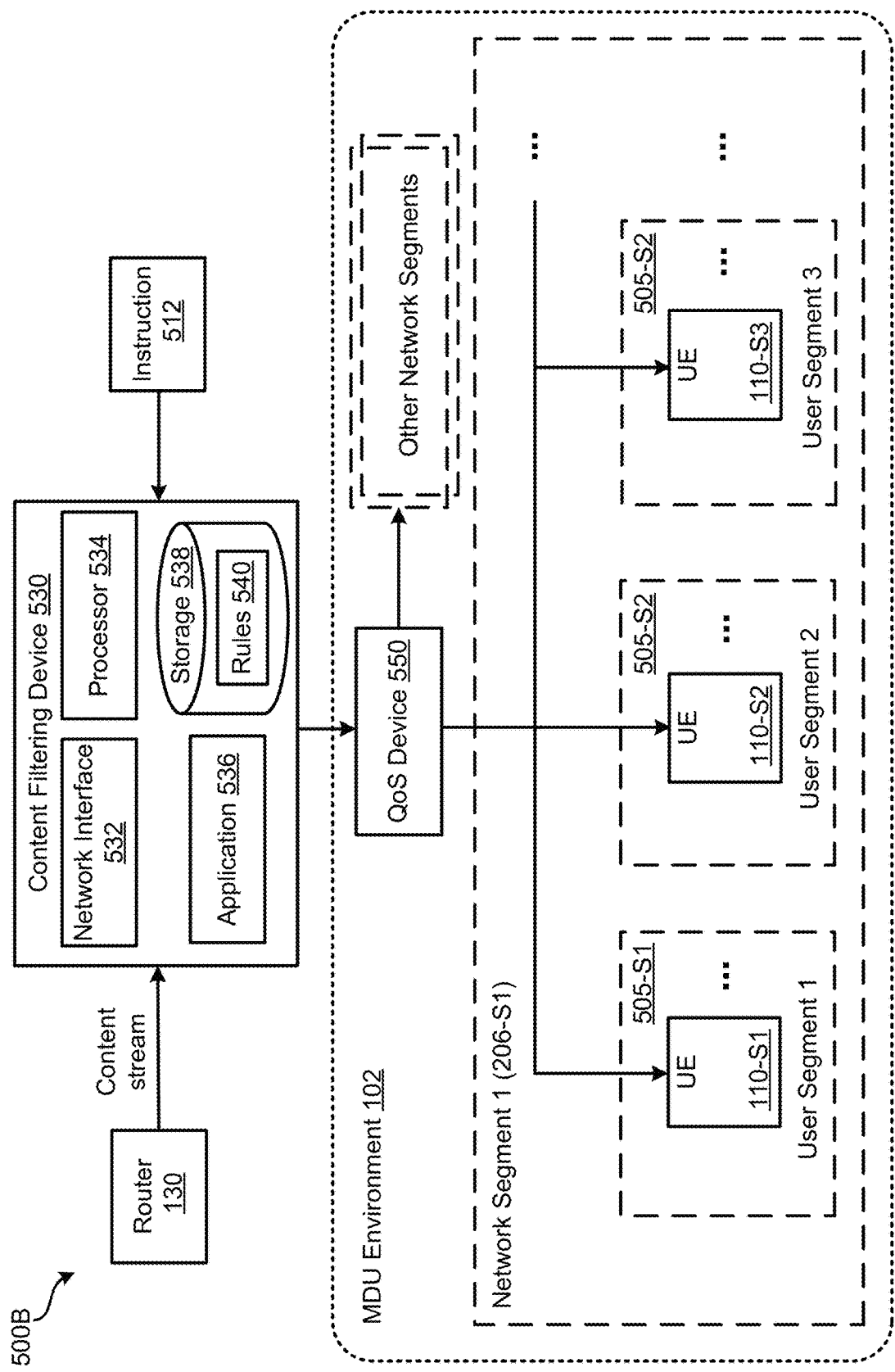
FIG. 5B illustrates a schematic diagram illustrating another example of a communications system according to various embodiments.

FIG. 5B is a schematic diagram illustrating another example of a communications system 500B (also referred to as "system 500B") according to various embodiments. The system 500B may be a part of the system 500A of FIG. 5 and configured to provision personalized streaming services and/or deliver personalized media content to a user included in a user segment and connected to a network segment. In the illustrated example, the system 500B includes, among other components, UEs 110 in an MDU environment 102, a content filtering device 530, and a quality-of-service (QOS) device 550. Various components included in the system 500B can communicate with each other through a communications network (not shown).

Multiple user segments 505 (e.g., user segment 505-S1, user segment 505-S2, and user segment 505-S3) are generated to respectively group the users of the MDU 102. Multiple integrated user-network segment profiles may be generated respectively corresponding to each user segment. UEs 110 in the MDU 102 may be associated with different user segments, according to each integrated segment profile. For example, UE 110-S1 belongs to user segment 1 (505-S1), UE 110-S2 belongs to user segment 2 (505-S2), and UE 110-S3 belongs to user segment 3 (505-S3).

The content filtering device 530 is configured to receive content, directly or indirectly, from the content provider 180 (shown in FIG. 5A), receive an instruction 512 (e.g., generated by and sent from the backend service system 201 of FIG. 2), filter the content according to the instruction 512, and send the filtered content to the user devices in the MDU 102. As an example, the content filtering device 530 may be a channel filtering device. The content filtering device 530 may be an independent device, a part integrated to the backend service system 201, or a part integrated to the content delivery system 306. For example, the content filtering device 530 may be integrated to the MDU gateway device 160 (FIG. 5A) or the router 130 (FIG. 5A).

In the illustrated example, the content filtering device 530 includes, among other components, a network interface 532, a processor 534, a content filtering application 536, and a storage 538. The network interface 532 is configured to receive data packets defining the content from the communications network and transfer the data packets to the processor 534. The network interface 532 is configured to receive an instruction from the service management subsystem 312 (FIG. 3A). As mentioned above, the instruction may indicate the designated content streaming service and content resource to be provisioned to a particular user segment according to the corresponding user segment profile or integrated segment profile.

The content filtering application 536 may be stored in a memory device. A set of pre-established filtering rules 540 are stored in the storage 538. The filtering rules 540 may be established based on the user segment profiles and further define the content or channel to be allowed or blocked with respect to each user segment 505 of the MDU 102. For example, an integrated user-network segment profile may include a channel list having allowed channels for the users belonging to the user segment and connected to the network segment 1 (206-S1). The filtering rules 540 may define the allowed channels for user segment 1 (505-S1) and network segment 1 (206-S1) and the channels excluded from the channel list or to be blocked. The filtering rules 540 may further define the filtering mechanism. For example, the filtering mechanism may be based on the network ID (e.g., a Service Set Identifier (SSID)) or IP addresses assigned to the UE 110 associated with a particular user segment, and content is delivered to the IP addresses assigned to the UE 110. The content filtering application 536 is executable by the processor 534 to cause the processor 534 to inspect and analyze the data packets of the content determine whether to allow or block the data packet for a user segment specified in the instruction 512 according to the filtering rules 540.

The QoS device 550 may be an independent device or a component integrated to the router 130 or another network routing device (not shown). In some embodiments, the QoS device 550 is integrated to the content filtering device The QoS device 550 may include a specialized network interface cards (NICs), a QoS engine, and other network devices or functions that are optimized for high-speed data packet processing and can apply pre-established QoS rules in real-time. Similar to the filtering rule 540, the QoS application may define the level of quality for content streaming service to be provisioned to a user of a particular user segment and connected to a particular network segment (e.g., the network segment 1 (206-S1)), according to the designated content streaming service to the network segment of the integrated user-network segment profile. The QoS application is configured to control network traffic and apply QoS rules, based on the user segment to which the traffic belongs. For example, the QoS application is executable to cause the QoS device 550 to deliver the content to a user belonging to a particular user segment and connected to a particular network segment at a bitrate level specified in the integrated user-network segment profile associated with the user. The QoS application may prioritize network traffic for each user segment within a particular network segment, based on other criteria such as the level of congestion or network capabilities specified in the corresponding integrated segment profile.

Figure 6:
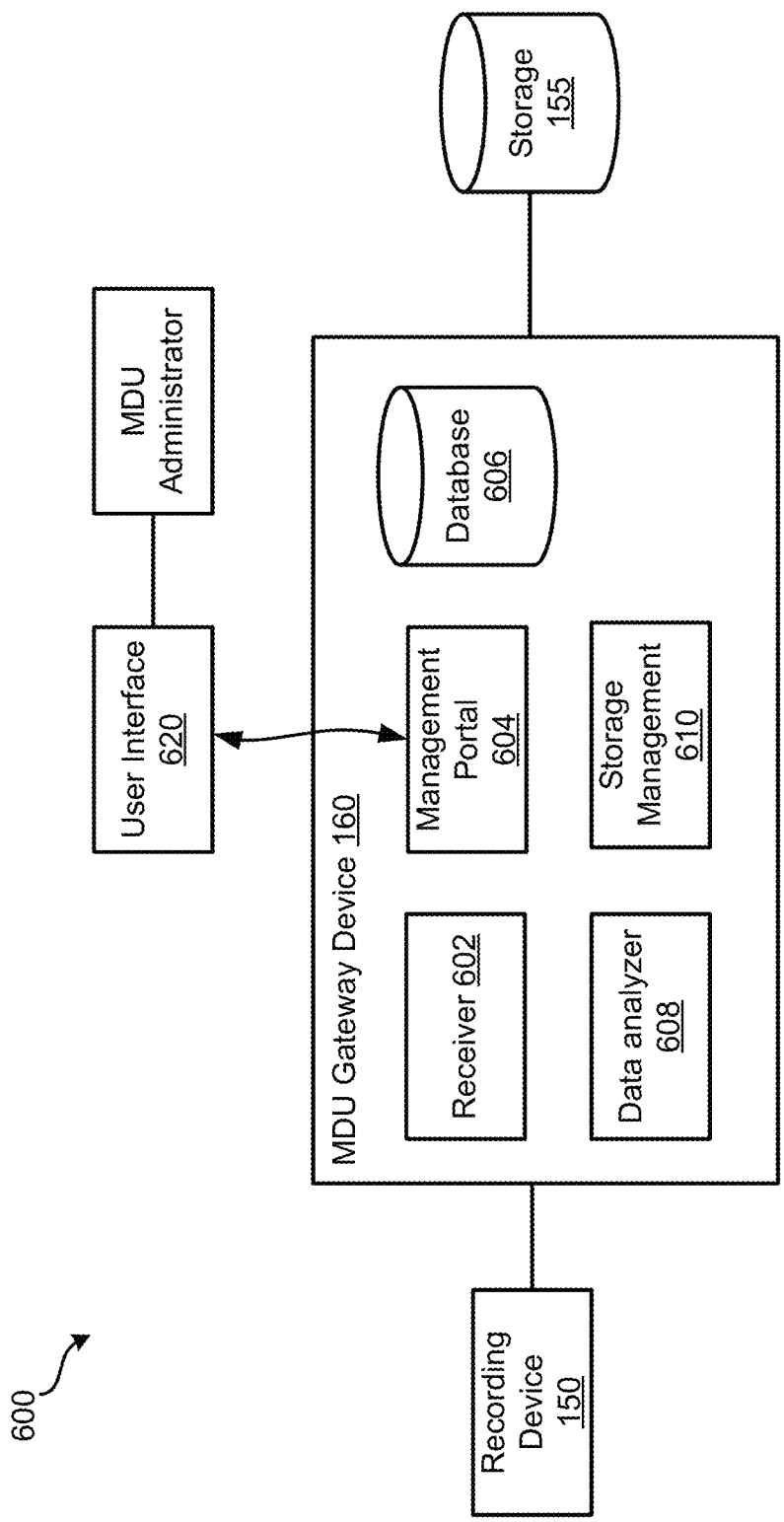
FIG. 6 illustrates a schematic diagram illustrating another example of a communications system according to various embodiments.

FIG. 6 is a schematic diagram illustrating another example of a communications system 600 (also referred to as "system 600") according to various embodiments. The system 600 may be a part of the system 100 or 200 described above and may include any component of the system 100 or 200. In the illustrated example, the system 600 includes, among other components, MDU gateway device 160, recording device 150, database 606, and storage device 155. The MDU gateway device 160 may further include, among other components, a receiver 602, a management portal 604, a data analyzer 608, and a database 606.

The receiver 602 is configured to receive and process signals from the OTA RF device 190 and the satellite 195 (shown in FIG. 1), or other sources internal or external to the MDU 102. The receiver 602 and may include a tuner, demodulator, a depacketizer, a demultiplexer, a decoder, an encryption module, and a decryption module, among other components. The receiver 602 may decode the signals received and deliver the content over the network to a specific device (e.g., the recording device 150 or the UE 110) within the MDU 102.

In some embodiments, the receiver 602 may be further configured to receive data or information from other components internal or external to the system 600. In some embodiments, the receiver 602 is configured to receive user profiles 376, user segment profiles 378, and/or integrated segment profiles 380 from backend service system 201. In some embodiments, the receiver 602 is configured to receive user registration data 372 from MDU PMS platform 401 and/or user activity data 374 from a third-party service provider. The received data or information is stored in the database 606.

The management portal 604 allows the administrator (e.g., the property manager of the MDU 102) to configure and manage the MDU gateway device 160. The management portal 604 may include a range of tools and features that allow administrators to manage user accounts, network settings, security settings, and other aspects of the network within the MDU 102. For example, administrators may be able to create and manage user accounts, set up and configure network access points, monitor network traffic and bandwidth usage, and configure security settings such as firewalls and intrusion detection systems for the communications system 100 shown in FIG. 1. In some embodiments, the management portal 604 may be a user interface such as a web-based interface that allows the administrator to configure and control the MDU gateway device 160.

The data analyzer 608 is configured to analyze the user segment profile or integrated segment profile and identify a target content item to be recorded and shared by the users of the MDU 102. In some embodiments, the data analyzer 608 is configured to generate a recommendation list for each user list. The recommendation list may include a baseline recommendation of one or more target content items to be recorded for sharing among MDU users included in a particular user segment profile. In some embodiments, the recommendation list may include a baseline recommendation of one or more target content items to be recorded for sharing among users belonging to a particular user segment and connected to a particular network segment, according to an integrated segment profile.

The recommendation list may include information regarding the target content item to be recorded, and the target content item may be a particular TV channel or a particular time slot thereof, a particular show, a particular sport, a particular program, or a particular event, recommended by the data analyzer 608 based on the type of the MDU 102 of the user list and the common characteristics shared by the users of the user list. The recommendation list may further include information regarding the start time, end time, estimated time length, streaming bitrate, streaming quality of each target content item as well as the estimated size of the target content item for the group recording.

In some embodiments, the data analyzer 608 may generate a recording list (i.e., a final recording list) that includes the target recording items that are determined for group recording, The final recording list may be included in a command or instruction that is sent to the recording device 150 for the recording device 150 to record the target recording item and generate a shared recording of the target recording item. Recording files are generated by the recording device 150. The recording device 150 may receive a command to record along with the recording list from the MDU gateway device 160. Recording the target recording item may be automatically triggered according to the recording list to generate a shared recording that includes the content of the target content item. In some embodiments, multiple shared recordings are generated, each shared recording corresponding to a particular target content item included in the recording list. The shared recordings may be stored in the storage device 155. The storage device 155 may be external to the MDU gateway device 160, or alternatively be an internal component integrated into the MDU gateway device 160.

In some embodiments, the recording list for each user segment and/or each network segment generated by the data analyzer is transmitted back to the backend service system 201. The shared recordings for each user segment and/or network segment are included in the streaming services and content resources designated to each user segment and/or network segment specified by the corresponding user segment profile and/or integrated segment profile. The recording list in the user segment profile and/or integrated segment profile may be periodically updated.

The storage management component 610 provides a centralized interface for managing the storage device 155, monitoring the availability of the storage device, deleting a shared recording stored in the storage device 155 after a pre-determined time. The storage management component 610 may be further used by the MDU administrator to configure the storage device, perform storage device backup and recovery, perform storage device optimization, and manage the storage device 155.

The MDU gateway device 160 may be controlled by an MDU administrator such as the property manager of the MDU 102 via a user interface 620. In some embodiments, the user interface 620 is provided in a device external to the MDU gateway device 160. Alternatively, the user interface 620 may be integrated to the MDU gateway device 160 as an internal component.

Figure 7:
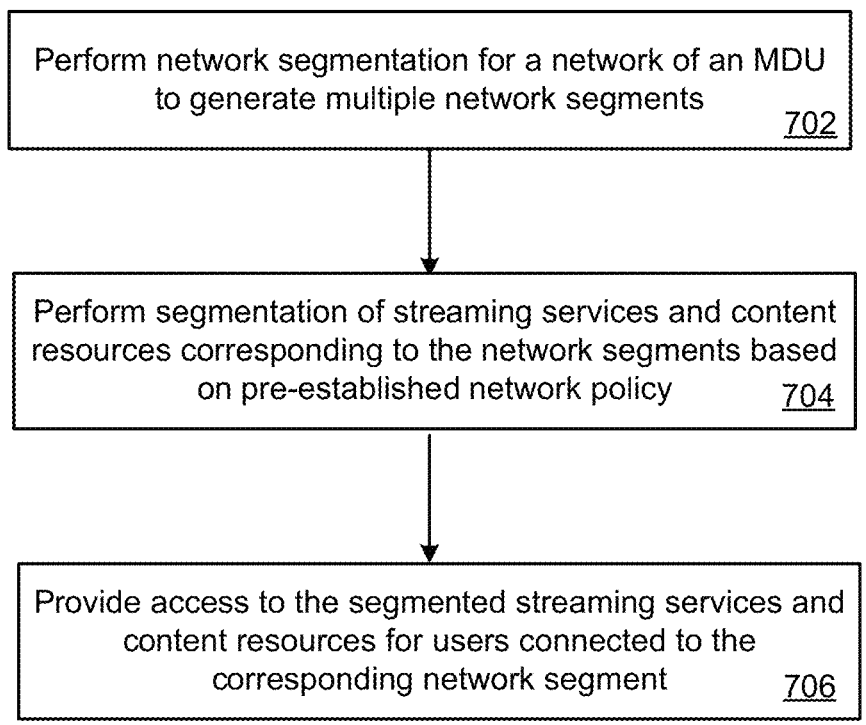
FIG. 7 is a flow diagram illustrating an example method for provisioning content streaming service to a user of an MDU, according to various embodiments.

FIG. 7 is a flow diagram illustrating an example method 700 for provisioning content streaming service to users of an MDU, according to various embodiments. The method 700 may be performed by a device or system described herein. Depending on the implementation, the method 700 may include additional, fewer, or alternative steps performed in various orders or in parallel.

At 702, network segmentation for a communications network of an MDU is performed to generate multiple network segments for users of the MDU. Network segmentation may be performed using a subnetting approach or a VLAN (virtual local area network) approach.

As an example of subnetting approach, multiple to-be-generated subnets of a network (i.e., a wireless network or Internet) for an MDU are determined. A private IP address pool (also referred to as IP pool) is assigned for the network of the MDU. The IP pool is divided into multiple subnet IP address ranges. A unique network identifier (also referred to as network ID) is assigned to each subnet. The network identifier maybe a Basic Service Set Identifier (BSSID), a Service Set Identifier (SSID), a Media Access Control (MAC) address, or a combination thereof. The router connected to the Internet is configured to route network traffics between the subnets and provide access control for each subnet. A switch connected to the router is configured to manage connections between the UEs and the router. Access points are configured to provide access (i.e., wireless access) to the UEs on each subnet. The access points are configured to provide wireless access to streaming services and content resources for the users on each subnet, according to the unique network ID for each subnet.

As an example of VLAN approach, multiple to-be-generated network segments of a network (i.e., a wireless network or Internet) for an MDU are determined. Multiple VLANs are identified respectively corresponding to the multiple network segments. A router connected to the network is configured to support the VLANs by creating virtual interfaces for each VLAN. A unique network ID is assigned to each VLAN. IP addresses are assigned to each virtual interface to enable routing between the virtual interfaces and allow communication between the VLANs. A switch connected to the router is configured to support the VLANs assigning a switch port to each corresponding VLAN. The access point associated with the corresponding VLAN is configured to broadcast the unique network ID for each VLAN and connect the access points to the switch ports assigned to the respective VLANs. IP addresses are assigned to UEs on each VLAN using DHCP. Access points are configured to provide wireless access to the UEs in each VLAN, according to the unique network ID for each VLAN.

At 704, segmentation of streaming services and content resources is performed. Streaming services and content resources are divided into and designated among the multiple network segments based on the pre-established network policy and/or integrated user-network segment profiles. As mentioned above, the network policy for streaming services and content resources for each network segment in an MDU would typically include rules and regulations regarding which types of content can be accessed by users connected to each network segment. The network policy would define the specific streaming services or content resources that are allowed or blocked on each network segment based on factors such as user level, network usage, and security requirements. Further, each integrated user-network segment profile further defines the streaming services and content resources designated to each network segment for a particular user segment defined in the integrated user-network segment profile.

At 706, access to the segmented streaming and content provisioning services is provided for users connected to the corresponding network segment. Examples of provisioning streaming and content services in details are described below with references to FIG. 9.

FIG. 8 is a flow diagram illustrating an example method 800 according to various embodiments. The method 800 may be performed by one or more components of the system or device described herein. Depending on the implementation, the method 800 may include additional, fewer, or alternative steps performed in various orders or in parallel.

At 802, user registration data of multiple users associated with an MDU is received on the backend service system, the user registration data including a user identifier and a user experience level for each user. At 804, a user profile for each user of the MDU is generated by the backend service system. The user profile includes the user registration level data, viewership data, user analytics data related to the user, and or one or more extracted features of the user. At 806, the users are grouped and separated into multiple user segments, each user segment including a list of users with at least one common user experience level, a common range of the user level scores, or a common user feature (attribute, interest, or characteristic) shared among the users.

At 808, content streaming services and/or content resources are designated to each user segment, based on a pre-defined resource allocation policy. The users of a user segment can consume the designated content streaming service and view the designated content according to the user segment profile. In some embodiments, content streaming services and/or content resources can be designated to each user segment using channel-based filtering techniques. For example, a channel list for the user segment may be created based on the common user features/attributes that are relevant and desirable for that user segment. A channel filtering mechanism may be used to apply the channel list to the content streaming service. This could involve blocking channels that are not relevant to the user segment, or highlighting channels that are particularly popular or important to that user segment.

In some embodiments, content streaming services and/or content resources can be designated to each user segment using streaming quality-based filtering techniques. For example, a list of content that can be streamed in a compatible quality to the user device can be created based on the common user experience level of the user segment profile. A user segment including premium booking types (premium guest rooms) or a high user level score may be designated with high-quality content streaming services such as higher bitrate streams or higher resolution content. A user segment including standard booking types (standard guest rooms) or an average user level score may be designated with standard-quality content streaming services. The content delivery system can be configured to provide the appropriate level of QoS to each user segment according to the designated content streaming service of the user segment profile. The content delivery system can dynamically adjust the bitrate or resolution of the stream based on the available network bandwidth and the capabilities of the user device to ensure optimal streaming quality.

In some embodiments, the content streaming service designated to a particular user segment includes shared recordings of content items previously stored in a local storage device connected to the content delivery system (e.g., an MDU gateway device). The shared recordings of the content are only accessible to the users belonging to that user segment. The shared recordings of the content items may be previously generated based on the common user experience level and/or common user features/attributes of the users of the user segment.

At 810, the streaming services and content resources designated to a particular user segment are further mapped to multiple network segments within the same user segment. Based on the common user experience level and common feature preferences according to the user segment, the streaming services and content resources are further segmented and mapped (aligned) to each network segment within the same user segment. The content resources and streaming services that align with the preferences and requirements of the users are designated to each network segment within the same user segment. An integrated user-network segment profile may be generated.

At 812, content streaming service is provided to a user of the MDU in response to a user request of a user, based on the user segment to which the user belongs and the network segment to which the user is connected. An instruction may be generated and sent to the content delivery system, and data of the content requested by the user is transmitted by the content delivery system to the user device according to the instruction.

Figure 9A:
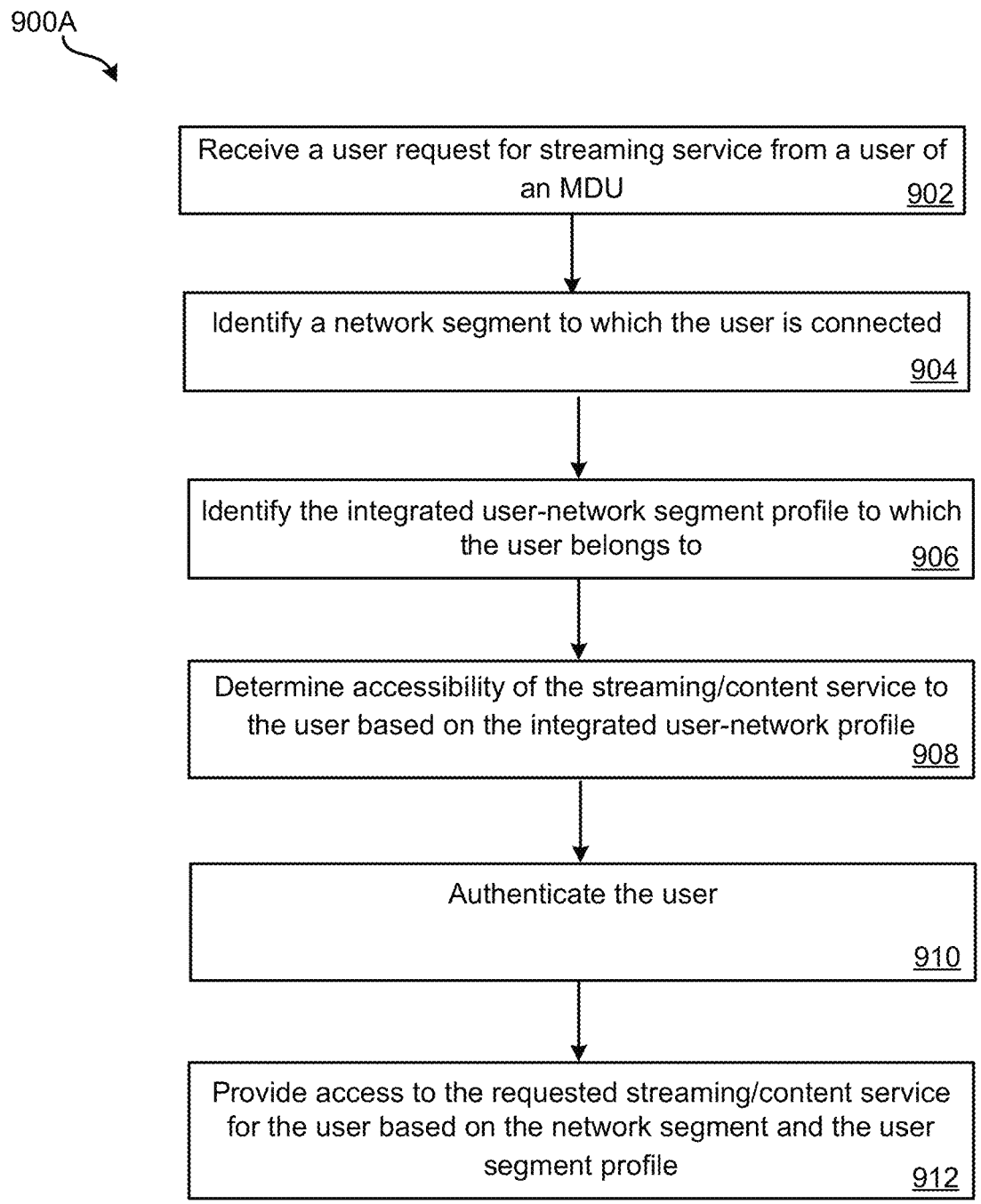
FIGS. 9A-9B are flow diagrams illustrating another example methods for provisioning content streaming service to a user of an MDU, according to various embodiments.

FIG. 9A is a flow diagram illustrating an example method 900A according to various embodiments. The method 900A may be performed by one or more components of the system or device described herein. Depending on the implementation, the method 900A may include additional, fewer, or alternative steps performed in various orders or in parallel.

At 902, a user request for content streaming service is received, on a backend service system. The user request is generated by a UE connected to a network segment of a network of an MDU. The user request may include user information and a unique network identifier of the network segment to which the UE is connected. The user information may include the user identity, UE identity, user account information, or other information in a user profile previously registered on the backend service system. The unique network identifier may include the network segmentation information such as the network identity (e.g., BSSID, SSID, MAC address) of the network segment to which the UE is connected and/or the IP address assigned to the UE.

At 904, the network segment is identified, by the backend service system, based on the unique network identity provided in the user request. For example, the network segment can be identified based on the BSSID, SSID, or the MAC address assigned to the network segment. The network may be a wireless network, and the network segment of the network may be a subnet of the network or a VLAN.

At 906, the user segment to which the user belongs to is determined. In some embodiments, the integrated user-network segment profile to which the user identity is associated is identified, and the user segment is determined based on the identified integrated user-network segment profile.

At 908, a determination is made on the accessibility of the content streaming service to the user, based on the identified integrated user-network segment profile and the pre-established network policy. As mentioned above, the pre-established network policy for streaming and content services for each network segment in the MDU would typically include rules and regulations regarding which types of content can be accessed by users connected to each network segment. The integrated user-network segment profile further defines the streaming services or content resources designated to the identified network segment.

At 910, an authentication process is performed, by the backend service system, to determine that the user of UE is authorized to access the requested content and/or that the UE is eligible to receive and stream the requested content. In some embodiments, the user information included in the user request is analyzed to facilitate the authentication process.

At 912, in response to the determination that the user is authorized and/or that the UE is eligible, access to the requested content is provided for the user.

Figure 9B:
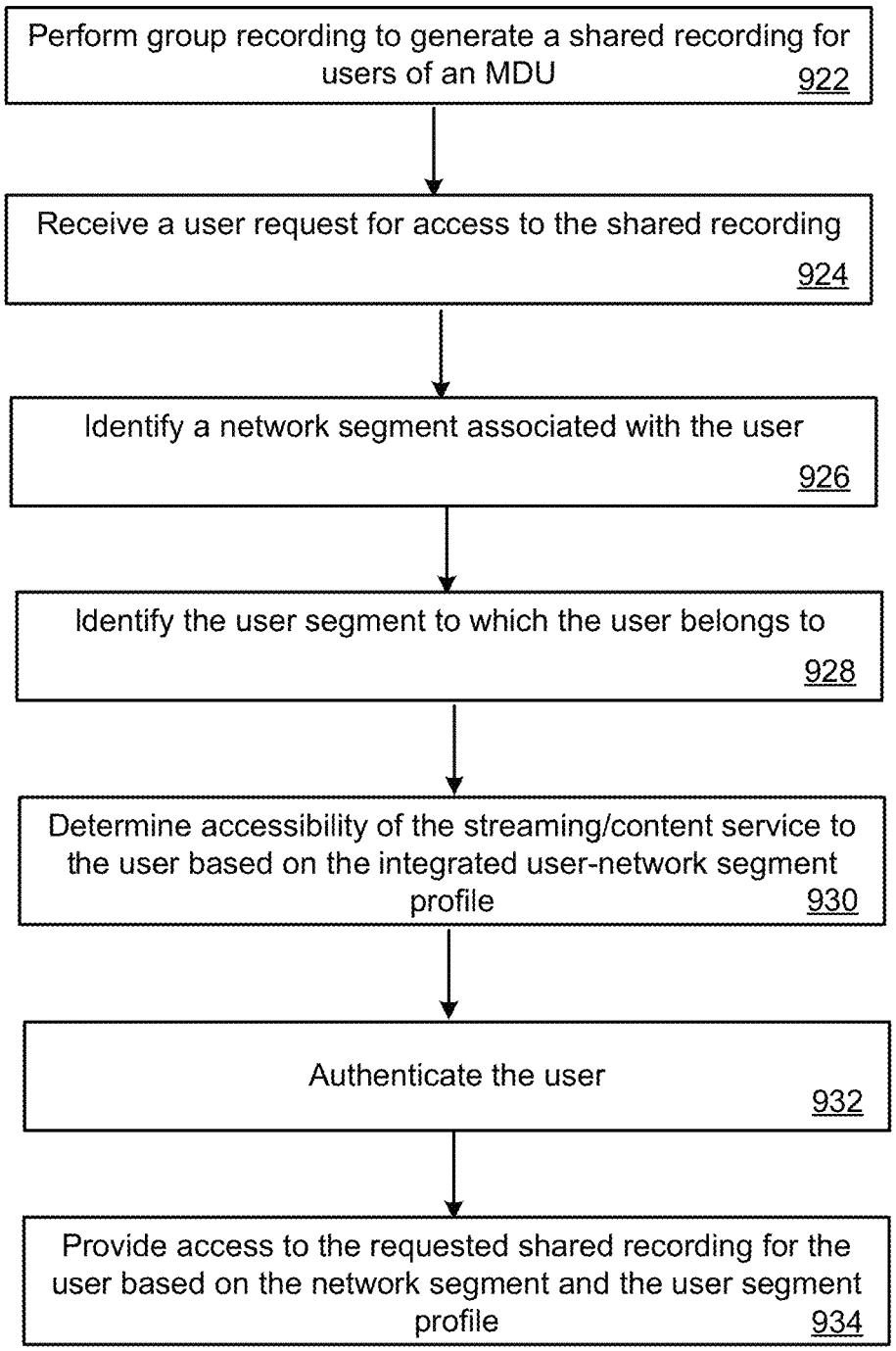

FIG. 9B is a flow diagram illustrating an example method 900B according to various embodiments. The method 900B may be performed by one or more components of the system or device described herein. Depending on the implementation, the method 900B may include additional, fewer, or alternative steps performed in various orders or in parallel.

At 922, group recording is performed to generate, by the recording device, a shared recording for users of an MDU. The group recording may be stored in the storage accessible by the MDU gateway device.

At 924, a user request for the content of the shared recording is received, on a backend service system. The user request is generated by a UE connected to a network segment of a network of an MDU. The user request may include user information and a unique network identifier of the network segment to which the UE is connected. The user information may include the user identity, UE identity, user account information, or other information in a user profile previously registered on the backend service system. The unique network identifier may include the network segmentation information such as the network identity (e.g., BSSID, SSID, MAC address) of the network segment to which the UE is connected and/or the IP address assigned to the UE.

At 926, the network segment is identified, by the backend service system, based on the unique network identity provided in the user request. For example, the network segment can be identified based on the BSSID, SSID, or the MAC address assigned to the network segment. The network may be a wireless network, and the network segment of the network may be a subnet of the network or a VLAN.

At 928, the user segment to which the user belongs to is determined. In some embodiments, the integrated user-network segment profile to which the user identity is associated is identified, and the user segment is determined based on the identified integrated user-network segment profile At 930, a determination is made on the accessibility of the shared recording to the user, based on the identified integrated user-network segment profile and the pre-established network policy. As mentioned above, the network policy may define the specific shared recordings that are allowed or blocked on each network segment based on factors such as user level, network usage, and security requirements. The integrated user-network segment profile further defines the shared recordings accessible through the identified network segment.

At 932, an authentication process is performed, by the backend service system, to determine that the user of UE is authorized to access the requested shared recording and/or that the UE is eligible to receive and stream the requested shared recording. In some embodiments, the user information included in the user request is analyzed to facilitate the authentication process.

At 934, in response to the determination that the user is authorized and/or that the UE is eligible, access to the requested shared recording is provided for the user.

Figure 10:
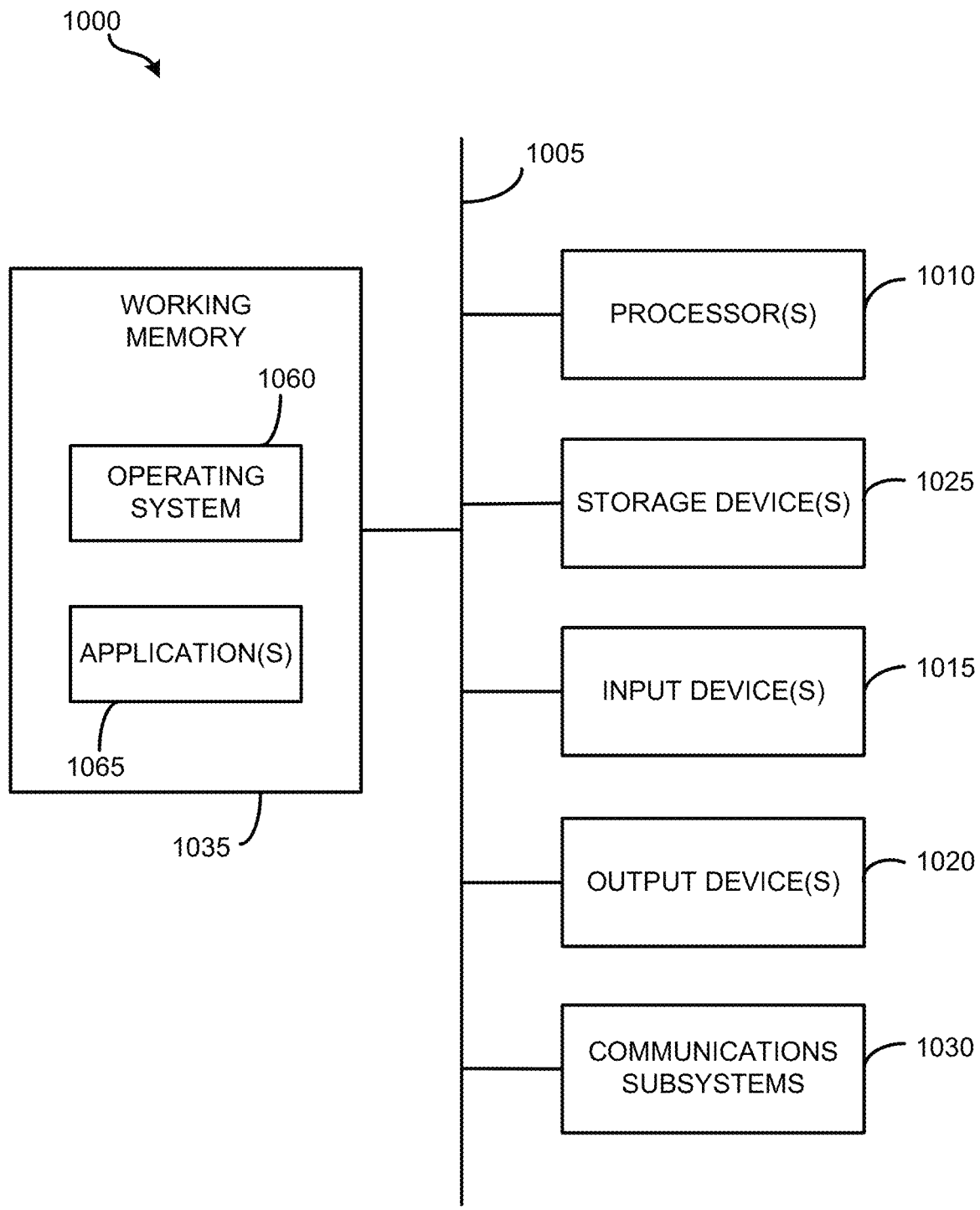
FIG. 10 is a schematic diagram illustrating an embodiment of a computer system according to various embodiments.

FIG. 10 is a schematic diagram illustrating an example of computer system 1000. The computer system 1000 is a simplified computer system that can be used to implement various embodiments described and illustrated herein. A computer system 1000 as illustrated in FIG. 10 may be incorporated into devices such as a portable electronic device, mobile phone, server grade machines, or other device as described herein. FIG. 10 provides a schematic illustration of one embodiment of a computer system 1000 that can perform some or all of the steps of the methods and workflows provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown including hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include without limitation a mouse, a keyboard, a camera, and/or the like; and one or more output devices 1020, which can include without limitation a display device, a printer, and/or the like.

The computer system 1000 may further include and/or be in communication with one or more non-transitory storage devices 1025, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1030. In other embodiments, a portable electronic device, e.g., the first electronic device, may be incorporated into the computer system 1000, e.g., an electronic device as an input device 1015. In some embodiments, the computer system 1000 will further include a working memory 1035, which can include a RAM or ROM device, as described above.

The computer system 1000 also can include software elements, shown as being currently located within the working memory 1035, including an operating system 1060, device drivers, executable libraries, and/or other code, such as one or more application programs 1065, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 1000 and/or might take the form of source and/or installable code, which, upon compilation and/or installation on the computer system 1000 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1000 to perform methods in accordance with various embodiments of the technology. According to a set of embodiments, some or all of the operations of such methods are performed by the computer system 1000 in response to processor 1010 executing one or more sequences of one or more instructions, which might be incorporated into the operating system 1060 and/or other code, such as an application program 1065, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

It should be understood that the content delivery and recording systems according to the present disclosure may include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present disclosure.

Further, while the following disclosure is made with respect to the recording of content (e.g., television (TV), movies, music videos, etc.), it should be understood that the systems and methods disclosed herein could also be used for of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A computer-implemented method, comprising:
   generating a plurality of network segments for a multi-dwelling unit (MDU), wherein each network segment corresponds to one zone of the MDU and is assigned with a unique network identifier;
   generating a plurality of user profiles respectively for a plurality of users associated with the MDU, wherein each user profile includes a user identity, user registration information, a user experience level, and at least one user feature of the user;
   generating a plurality of user segments and associating one or more of the plurality of users to each user segment, based on a common user experience level shared among the users of the user segment;
   generating an integrated user-network segment profile for each user segment, the integrated user-network segment profile including streaming service and content resource designated to each one of the network segments within the user segment;
   receiving a user request for streaming a content item from a user equipment (UE) connected to one of the network segments, the user request including the network identifier assigned to the network segment and the user identity associated with the user;
   identifying the integrated user-network segment profile to which the user belongs, based on the user identity;
   identifying the network segment to which the UE is connected, based on the network identifier;
   determining accessibility of content item to the user based on the streaming services and content resources designated to the identified network segment and the identified user segment; and
   in response to a determination that the content item is accessible through the network segment, transmitting the requested content item to the UE via a routed network traffic over the network segment.

2. The method of claim 1, wherein designating streaming service and content resource to each user segment further comprises creating a channel list for each network segment within the user segment, and
   wherein provisioning the designated streaming service and content resource further comprises applying the channel list to the content streaming service using a channel filtering mechanism to block channels that are not included in the channel list.

3. The method of claim 1, wherein designating streaming service and content resource to each user segment further comprises setting a specified streaming bitrate for the users belonging to the identified user segment and connected to identified network segment, and
   wherein provisioning the designated streaming service and content resource further comprises delivering content to the user belonging to the identified user segment and connected to the identified network segment at the specified streaming bitrate.

4. The method of claim 1, wherein provisioning the designated streaming service and content resource further comprises sending a personalized user interface template for content streaming to the UE of the user belonging to the identified user segment and connected to the identified network segment, the personalized user interface template configured to display designated content to the user and provide designated interactive features to the users through the personalized user interface template.

5. The method of claim 1, wherein the designated streaming service and content resource is a recording of a content item to be shared by the users belonging to the identified user segment and connected to the identified network segment, the recording being stored in a local device within the MDU.

6. The method of claim 1, further comprising:
   receiving a user onboard notice from the user prior to the user request, the user onboard notice indicating that the user logs in the MDU and including a user identity of the user; and
   identifying presence or absence of a user profile associated with the user in the plurality of user profiles, based on the user identity included in the user onboard notice.

7. The method of claim 6, further comprising:
   in response to the presence of the user profile associated with the user, identifying the user segment to which the user belongs.

8. The method of claim 6, further comprising:
   in response to the absence of the user profile associated with the user, sending a request for user registration data of the user to an MDU property management solution platform;
   receiving user registration data from the MDU property management solution platform;
   generating a user profile for the user based on the user registration data;
   identifying a user segment in the plurality of user segments; and
   associating the user profile to the identified user segment.

9. A system comprising:
   one or more processors; and
   a computer-readable storage media storing computer-executable instructions that, when executed by the one or more processors, cause the system to:
   generate a plurality of network segments for a MDU, wherein each network segment corresponds to one zone of the MDU and is assigned with a unique network identifier;
   generate a plurality of user profiles respectively for a plurality of users associated with the MDU, wherein each user profile includes a user identity, user registration information, a user experience level, and at least one user feature of the user;
   generate a plurality of user segments and associating one or more of the plurality of users to each user segment, based on a common user experience level shared among the users of the user segment;
   generate an integrated user-network segment profile for each user segment, the integrated user-network segment profile including streaming service and content resource designated to each one of the network segments within the user segment;

receive a user request for streaming a content item from a UE connected to one of the network segments, the user request including the network identifier assigned to the network segment and the user identity associated with the user;

identify the integrated user-network segment profile to which the user belongs, based on the user identity;

identify the network segment to which the UE is connected, based on the network identifier;

determine accessibility of content item to the user based on the streaming services and content resources designated to the identified network segment and the identified user segment; and in response to a determination that the content item is accessible through the network segment, transmit the requested content item to the UE via a routed network traffic over the network segment.

10. The system of claim 9, wherein the instructions are further executable to cause one or more electronic processors of the system to:

create a channel list for each network segment within the user segment, and apply the channel list to the content streaming service using a channel filtering mechanism to block channels that are not included in the channel list.

11. The system of claim 9, wherein the instructions are further executable to cause one or more electronic processors of the system to:

set a specified streaming bitrate for the users belonging to the identified user segment and connected to identified network segment, and deliver content to the user belonging to the identified user segment and connected to the identified network segment at the specified streaming bitrate.

12. The system of claim 9, wherein the instructions are further executable to cause one or more electronic processors of the system to:

send a personalized user interface template for content streaming to the UE of the user belonging to the identified user segment and connected to the identified network segment, the personalized user interface template configured to display designated content to the user and provide designated interactive features to the users through the personalized user interface template.

13. The system of claim 9, wherein the designated streaming service and content resource is a recording of a content item to be shared by the users belonging to the identified user segment and connected to the identified network segment, the recording being stored in a local device within the MDU.

14. The system of claim 9, wherein the instructions are further executable to cause one or more electronic processors of the system to:

receive a user onboard notice from the user prior to the user request, the user onboard notice indicating that the user logs in the MDU and including a user identity of the user; and identify presence or absence of a user profile associated with the user in the plurality of user profiles, based on the user identity included in the user onboard notice.

15. The system of claim 14, wherein the instructions are further executable to cause one or more electronic processors of the system to:

identify the user segment to which the user belongs, in response to the presence of the user profile associated with the user.

16. The system of claim 14, wherein the instructions are further executable to cause one or more electronic processors of the system to:

send a request for user registration data of the user to an MDU property management solution platform, in response to the absence of the user profile associated with the user;

receive user registration data from the MDU property management solution platform;

generate a user profile for the user based on the user registration data;

identify a user segment in the plurality of user segments; and associate the user profile to the identified user segment.

17. A non-transitory machine-readable storage medium encoded with instructions, the instructions executable to cause one or more electronic processors of a system to:

generate a plurality of network segments for a MDU, wherein each network segment corresponds to one zone of the MDU and is assigned with a unique network identifier;

generate a plurality of user profiles respectively for a plurality of users associated with the MDU, wherein each user profile includes a user identity, user registration information, a user experience level, and at least one user feature of the user;

generate a plurality of user segments and associating one or more of the plurality of users to each user segment, based on a common user experience level shared among the users of the user segment;

generate an integrated user-network segment profile for each user segment, the integrated user-network segment profile including streaming service and content resource designated to each one of the network segments within the user segment;

receive a user request for streaming a content item from a UE connected to one of the network segments, the user request including the network identifier assigned to the network segment and the user identity associated with the user;

identify the integrated user-network segment profile to which the user belongs, based on the user identity;

identify the network segment to which the UE is connected, based on the network identifier;

determine accessibility of content item to the user based on the streaming services and content resources designated to the identified network segment and the identified user segment; and in response to a determination that the content item is accessible through the network segment, transmit the requested content item to the UE via a routed network traffic over the network segment.

18. The non-transitory machine-readable storage medium of claim 17, wherein, the instructions is further executable to cause one or more electronic processors of the system to:

set a specified streaming bitrate for the users belonging to the identified user segment and connected to identified network segment, and deliver content to the user belonging to the identified user segment and connected to the identified network segment at the specified streaming bitrate.

19. The non-transitory machine-readable storage medium of claim 17, wherein, the instructions is further executable to cause one or more electronic processors of the system to:

send a personalized user interface template for content streaming to the UE of the user belonging to the identified user segment and connected to the identified network segment, the personalized user interface template configured to display designated content to the user and provide designated interactive features to the users through the personalized user interface template.

20. The non-transitory machine-readable storage medium of claim 17, wherein, the instructions is further executable to cause one or more electronic processors of the system to:
receive a user onboard notice from the user prior to the user request, the user onboard notice indicating that the user logs in the MDU and including a user identity of the user; and
identify presence or absence of a user profile associated with the user in the plurality of user profiles, based on the user identity included in the user onboard notice.

* * * * *